US007128651B2

(12) United States Patent
Miyamoto et al.

(10) Patent No.: US 7,128,651 B2
(45) Date of Patent: Oct. 31, 2006

(54) CARD GAME FOR DISPLAYING IMAGES BASED ON SOUND RECOGNITION

(75) Inventors: Tomoji Miyamoto, Tokyo (JP); Yasushi Watanabe, Tokyo (JP); Junichi Itonaga, Tokyo (JP); Tomio Kikuchi, Tokyo (JP); Muneoki Kamata, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 10/457,086

(22) Filed: Jun. 9, 2003

(65) Prior Publication Data

US 2003/0199316 A1 Oct. 23, 2003

Related U.S. Application Data

(63) Continuation of application No. 09/179,748, filed on Oct. 28, 1998, now Pat. No. 6,607,443.

(30) Foreign Application Priority Data

Nov. 12, 1997 (JP) .................................. 9-310771
Feb. 17, 1998 (JP) ................................. 10-035260
Jul. 16, 1998 (JP) ................................. 10-201534

(51) Int. Cl.
*A63F 13/10* (2006.01)

(52) U.S. Cl. .......................................... 463/35; 463/30

(58) Field of Classification Search .............. 463/1–20, 463/30–35, 40–42; 273/459–461; 704/246, 704/275; 345/716
See application file for complete search history.

(56) References Cited

U.S. PATENT DOCUMENTS 4,333,152 A * 6/1982 Best .......................... 345/716
4,357,488 A * 11/1982 Knighton et al. ........... 704/246
4,569,026 A * 2/1986 Best .......................... 345/716
4,687,200 A 8/1987 Shirai ..................... 273/148 B
4,704,696 A * 11/1987 Reimer et al. .............. 704/275
4,724,307 A 2/1988 Dutton et al. ............... 235/455
4,887,819 A 12/1989 Walker ....................... 273/256
5,091,947 A * 2/1992 Ariyoshi et al. ............ 704/246
5,149,104 A 9/1992 Edelstein .................... 273/434
5,221,083 A * 6/1993 Dote ........................... 463/32
5,288,078 A 2/1994 Capper et al. .......... 273/148 B
5,317,505 A 5/1994 Karabed et al. ............ 364/410
5,414,256 A 5/1995 Gurner et al. .............. 250/221
5,453,758 A 9/1995 Sato ........................... 345/158
5,521,616 A 5/1996 Capper et al. .............. 345/156
5,583,965 A * 12/1996 Douma et al. .............. 704/275
5,616,078 A 4/1997 Oh ................................ 463/8
5,688,174 A * 11/1997 Kennedy ..................... 463/37

(Continued)

FOREIGN PATENT DOCUMENTS

BE WO 96/30856 10/1996

(Continued)

*Primary Examiner*—Scott Jones
(74) *Attorney, Agent, or Firm*—Finnegan, Henderson, Farabow, Garrett & Dunner, L.L.P.

(57) ABSTRACT

Provides a game machine with exceptional interactivity capable of ascertaining players' psychological states from player's voices and actions. It is a game device for executing a prescribed game program in response to information input by players. Comprises a device for recognizing voices or actions made by players, and a processing board for ascertaining the condition of recognized voices and actions, and, for a given voice or given action, modifying the game device response processing operations to the voice or action in response to the condition of the voice or action.

15 Claims, 25 Drawing Sheets

U.S. PATENT DOCUMENTS

| | | | | |
|---|---|---|---|---|
| 5,803,453 | A | 9/1998 | Stephan et al. | 273/138.2 |
| 5,831,527 | A | 11/1998 | Jones, II et al. | 340/540 |
| 5,961,121 | A | 10/1999 | Brown | 273/309 |
| 6,004,205 | A * | 12/1999 | Lauretta et al. | 463/11 |
| 6,529,875 | B1 * | 3/2003 | Nakajima et al. | 704/275 |
| 6,607,443 | B1 * | 8/2003 | Miyamoto et al. | 463/40 |
| 2003/0236113 | A1 * | 12/2003 | Webb | 463/11 |
| 2004/0029636 | A1 * | 2/2004 | Wells | 463/32 |
| 2004/0063482 | A1 * | 4/2004 | Toyoda | 463/11 |

FOREIGN PATENT DOCUMENTS

| | | | |
|---|---|---|---|
| JP | 2660586 | | 6/1997 |
| WO | WO 95/31264 | * | 11/1995 |
| WO | WO 98/02223 | * | 1/1998 |

* cited by examiner

FIG.22
401a
HIT
STAND
HAND ACTION SYSTEM
401b
401c

CARD GAME FOR DISPLAYING IMAGES BASED ON SOUND RECOGNITION

RELATED INVENTION

This application is a continuation of U.S. application Ser. No. 09/179,748 filed on Oct. 28, 1998, now U.S. Pat. No. 6,607,443 entitled GAME DEVICE.

BACKGROUND OF THE INVENTION

1. Field of the Invention

The present invention relates to a game device, and more particularly to a game device capable of incorporating voices and/or movements made by players, subtle changes in the psychological state of the players, as manifested in player voices and/or player movement, and operating commands input by the players being acquired by the game processor board to provide multiple variants of game development.

2. Description of the Related Art

Interactive game devices of the prior art include those simulating a game in which at least one player faces a character (dealer) appearing in the game, the interactive game developing through processing of a stored game program.

An example of such an interactive game device is taught in Japanese Patent No. 2660586 The interactive game device taught in this publication comprises a projection space provided to the central portion of the front of the interactive game machine, a background provided behind the projection space, satellite sections, located in front of the projection space, provided with control sections for conducting game play while viewing the projection space and the satellite display means, a display device for displaying display images on a display screen facing the projection space, and virtual image creation means for creating virtual images of display images on the display device in front of the background while causing them to pass through the background, providing synthesized images in which display images and background images are combined to produce the impression of actually facing a dealer.

According to this game device, a player experiences the game while viewing a synthesized image simulating actually facing a dealer; an advantage thereof is that the game can proceed as the player savors the feeling of actually being dealt cards by the dealer. During the game, the player can operate a control member to give various instructions to the dealer.

While the foregoing game device of the prior art offers the advantage that a player can experience the game while viewing synthesized images simulating actually facing a dealer, the fact that information can only be provided to the dealer through operation of control elements, pressing keys on a keyboard device, or pressing the mouse button means that the entry data is fixed, making it difficult to convey to the game machine the subtle psychological state of the player. Accordingly, dealer action and expression are rendered in unvaried fashion, contributing to a lack of suspense and an inability to introduce variation into game execution. The experience provided by such game devices is lacking in rich bidirectional interface between game machine and player (interactivity).

SUMMARY OF THE INVENTION

The inventors perfected the present invention with an object of providing a game device affording exceptional interactivity through ascertainment of the psychological state of a player from voices and actions made by the player.

It is a further object of the present invention to provide a game device endowed with exceptional interactivity through the ability to recognize various states, such as the voices and actions made by a player.

It is another object of the present invention to provide a game device capable of reflecting subtle psychological states of the player in the development of the game by sensing and analyzing player voices and actions.

It is a still further object of the present invention to provide a game device capable of altering the development of the game in response to voices made by players.

It is a still further object of the present invention to provide a game device capable of altering the development of the game in response to the player's actions.

The game device which pertains to the present invention provides a game device which executes a prescribed game program corresponding to information entered by players, comprising: means for recognizing voices and/or actions made by the players; means for determining conditions of recognized voices and/or actions; and processor for performing response processing corresponding to the conditions of recognized voices and/or actions.

The present invention is characterized in that subtle interior psychological states of a player are simulated through the agency of sounds or actions made by the player, these states being reflected in the development of the game. A further characterizing feature is that player actions, such as judgment of the cards at hand, are used to simulate player sophistication, such as his or her strong and weak points, and to reflect this feature is that by sensing these actions, the game machine can be provided with input that closely approximates that in an actual card game, for example, of a sort that is not achieved through button operation of a keyboard, control pad, or other peripheral device, causing the game device to execute processing in response to input approximating the real thing.

In the present invention, features such as sound level, pitch, intonation, and tone are extracted from sounds. Features such as rapidity of movement, breadth of movement, and movement time are extracted from player actions. Movements as used herein are embodied principally in hand movements, but are not limited thereto; movements of other parts of the players' body are permitted as well. Movement is used herein to include facial expressions as well.

The game device which pertains to the present invention comprises imaging means for converting players' actions into picture signals; image recognition means for performing image recognition on the picture signals and outputting image recognition signals; and processor for developing the game corresponding to conditions of the image recognition signals.

The game device which pertains to the present invention comprises input means for detecting player actions and converting them into electrical signals; first processor for computing player actions on the basis of said electrical signals from said input means; and second processor for developing the game corresponding to computation results from said first processor.

The game device which pertains to the present invention comprises optical input means for sensing player actions and converting these to electrical signals; first processor for computing player action on the basis of said electrical signals from said optical input means; control means for direct control by the players; and second processor for developing the game corresponding to computation result from said first processor and/or control commands from said control means.

DESCRIPTION OF THE PREFERRED EMBODIMENTS

Embodiments of the present invention will now be illustrated referring to the accompanying drawings.

Embodiment 1

Figure 1:
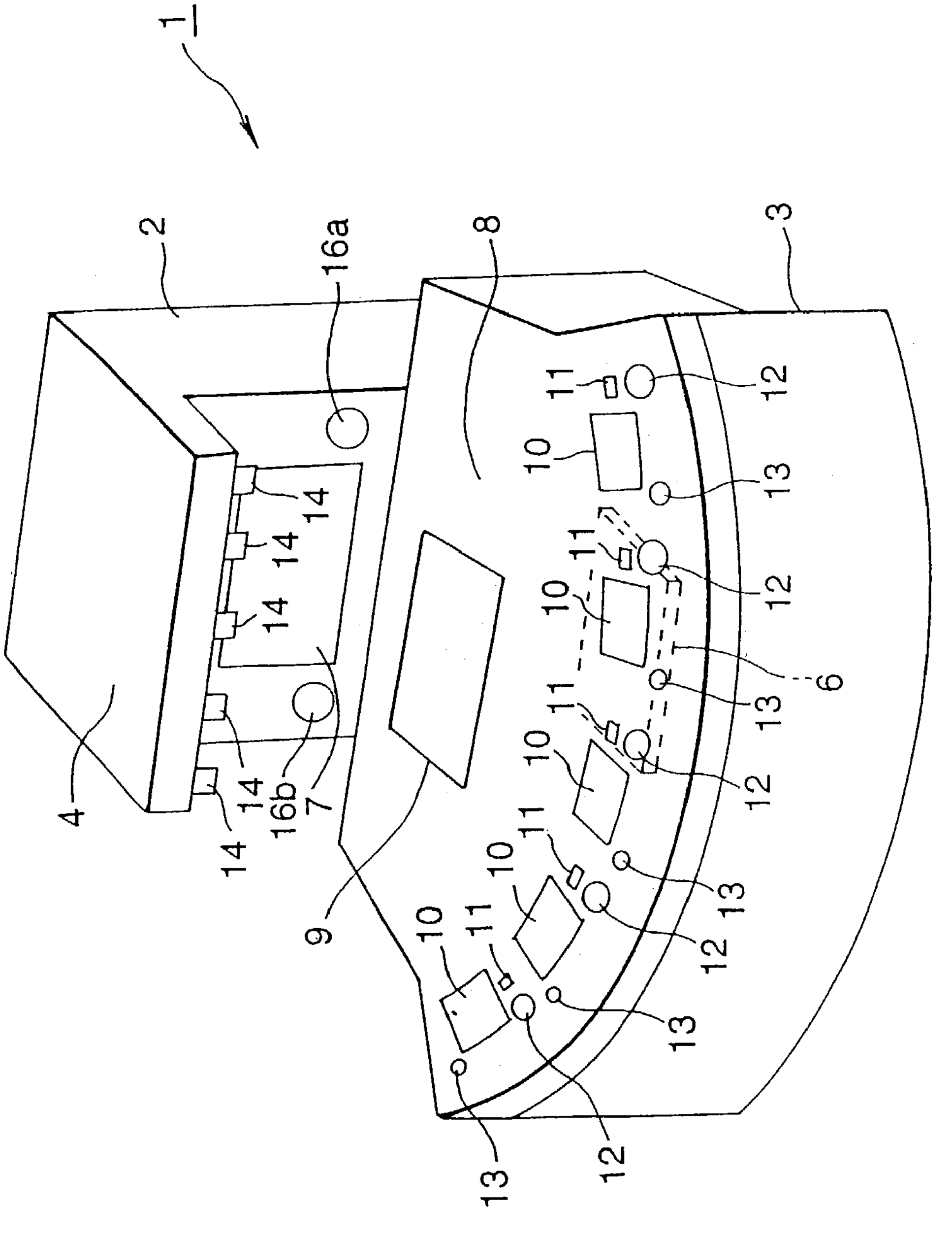
FIG. 1 is a perspective view depicting an embodiment of the game machine of the present invention.
Figure 2:
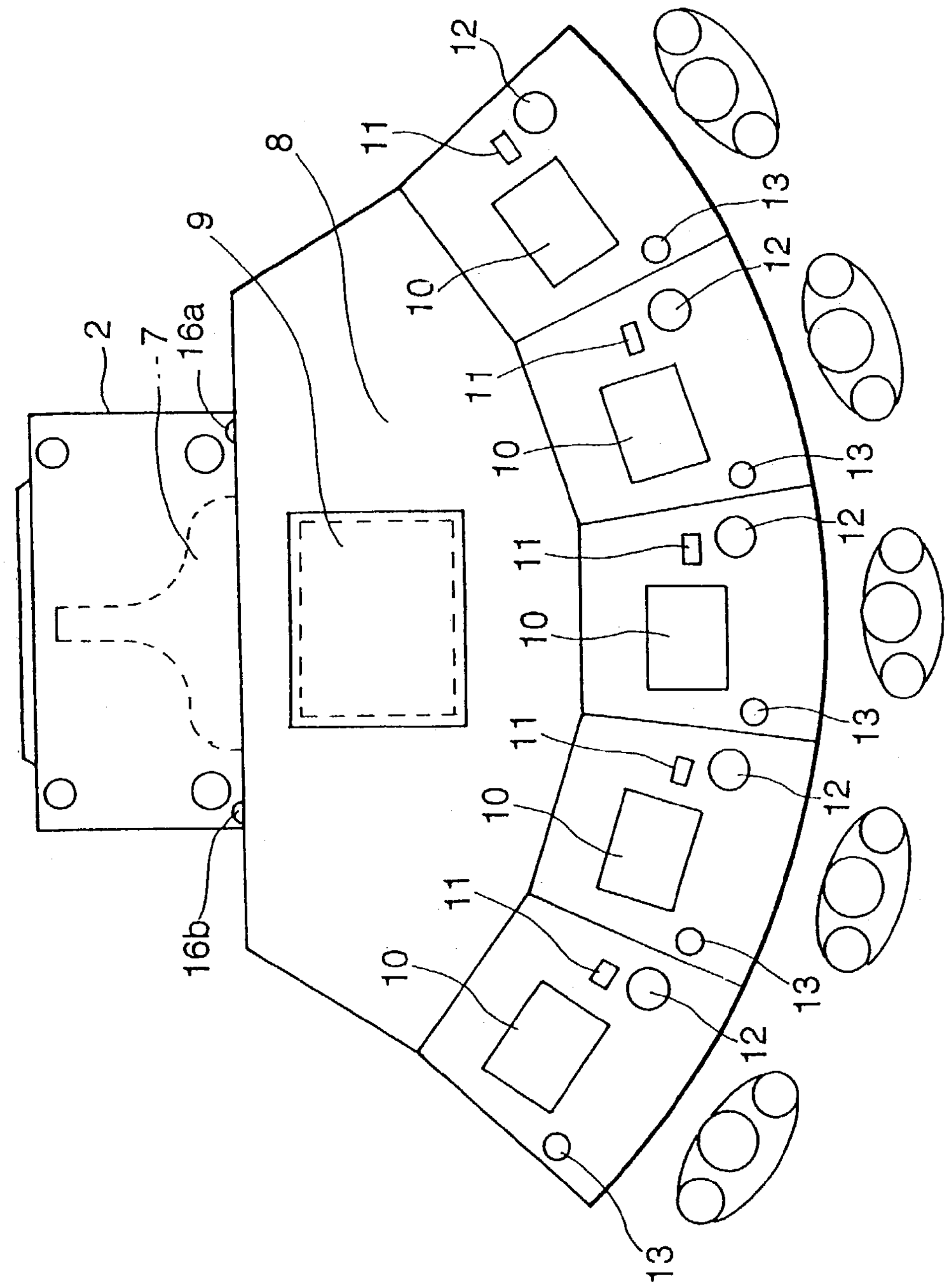
FIG. 2 is a plan view of the embodiment.
Figure 3:
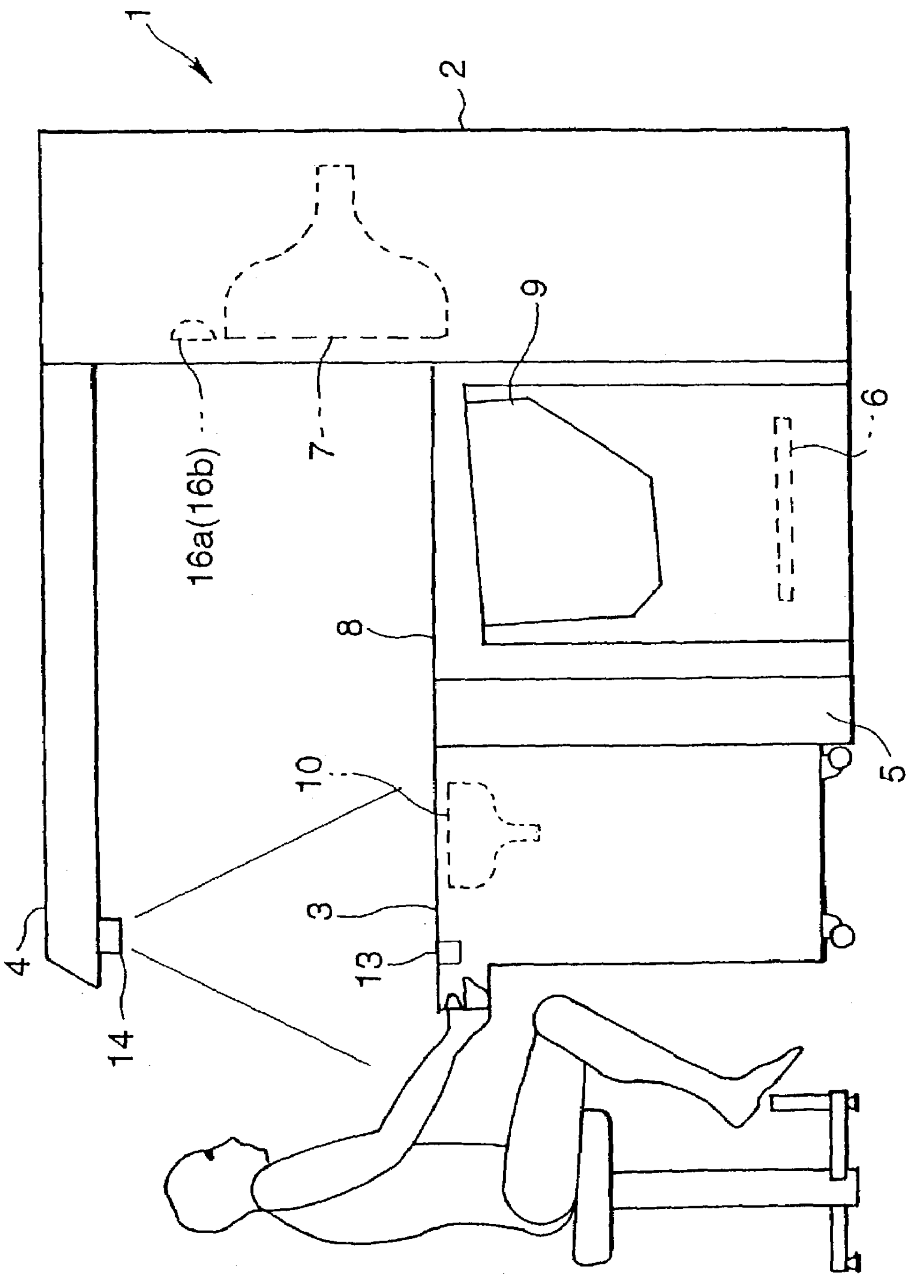
FIG. 3 is a side view of the embodiment.

FIGS. 1 through 3 illustrate EMBODIMENT 1 pertaining to the present invention; FIG. 1 showing a perspective view of the device, FIG. 2 showing a partly sectional plan view of the device, and FIG. 3 showing a partly cutaway side view of the device.

Referring to the drawings, the interactive game device 1 broadly comprises an upward projecting section 2 on whose screen a character simulating the dealer is displayed, a plurality of satellites 3 located on the player side, and a forward extending section 4 extending forward from the upward projecting section 2 towards the satellites 3. The housing 5 on which the satellites 3 are arranged houses a motherboard 6, power circuitry, and other circuitry. The motherboard 6 is capable of executing the game and other information processing operations.

A CRT display 7 is arranged facing the players in the upward projecting section 2, the display 7 being constituted so as to display a character representing a dealer, for example. Another CRT display 9 is arranged on a table 8 located to the front of the upward projecting section 2, and this display 9 shows the dealer's cards, for example. In order to facilitate viewing of the display screen of the display 9 by the players, it is inclined towards the players, as shown in FIG. 3. These displays 7 and 9 are electrically connected to the motherboard 6.

Each satellite 3 is provided with its own CRT satellite display 10, each satellite display 10 displaying the cards of a particular player. Each of the satellite displays 10 is electrically connected to the motherboard 6. While the satellite displays 10 described above comprise CRT, other types of displays are possible. Specifically, displays having other display formats, such as plasma displays or liquid crystal displays, may be used provided that the device is capable of displaying electrical signals as images.

Each of the satellites 3 is provided with a token insertion slot 11 and a token receptacle 12. Tokens are wagered through the token insertion slot 11, and in the event of a win, the winning player receives his or her share of tokens dispensed into the token receptacle 12.

Each of the satellites 3 is further provided with a microphone 13, the microphones 13 being electrically connected to the motherboard 6. The microphones 13 convert into sound signals sounds uttered by the players sitting at the satellites, and these signals are presented to the motherboard 6. The microphones 13 convert sounds issued by players sitting at the satellites 3 into sound signals which are presented to the motherboard 6.

At the distal edge of the forward extending section 4 are arranged CCD cameras 14 that serve as the imaging means. The movements, especially hand movements, of the players seated at the satellites 3 are converted into picture signals by the CCD cameras 14 and presented to the motherboard 6. Progress of the game is controlled through the CCD cameras 14.

To both sides of the upward projecting section 2 are arranged speakers 16_a_ and 16_b_. These speakers 16_a_ and 16_b_ are electrically connected to the motherboard 6 and emit the effect sounds which accompany development of the game. In EMBODIMENT 1, CCD cameras serve as the means by which the game device acquires players' movements, but cameras employing elements other than the cameras 14 could be used as well. That is, any type of camera may be used, provided that it can convert optical images into electrical signals that can be input to the game device.

Figure 4:
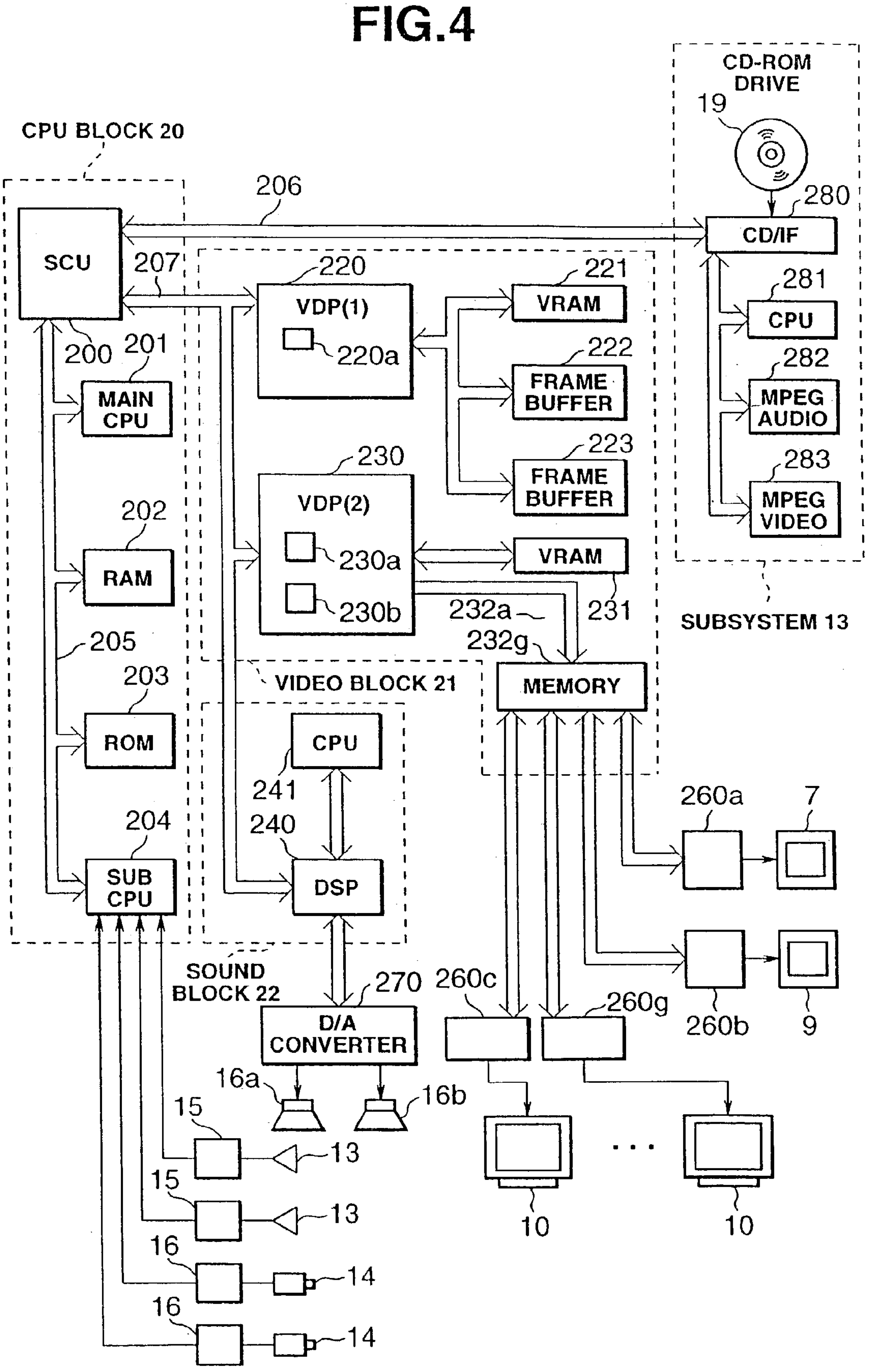
FIG. 4 is a block diagram of processing circuitry in the embodiment.

FIG. 4 is a block diagram of processing circuitry in the game device EMBODIMENT 1. The game device housing comprises a CPU block 20 for controlling the whole device, a picture block 21 for controlling the game screen display, a sound block for producing effect sounds and the like, and a subsystem for reading out CD-ROM.

The CPU block 20 comprises an SCU (System Control Unit) 200, a main CPU 201, RAM 202, RAM 203, a sub-CPU 204, and a CPU bus 205. The main CPU 201 contains a math function similar to a DSP (Digital Signal Processing) so that application software can be executed rapidly.

The RAM 202 is used as the work area for the main CPU 201. The RAM 203 stores the initialization program used for the initialization process. The SCU 200 controls the busses 205, 206 and 207 so that data can be exchanged smoothly among the VEPs 220 and 230, the DSP 241, and other components. The SCU 200 contains a DMA controller, allowing data (polygon data) for character(s) in the game to be transferred to the VRAM in the picture block 21. This allows the game machine or other application software to be executed rapidly.

The sub-CPU 204 is termed an SMPC (System Manager & Peripheral Control). Its functions include collecting sound recognition signals from the sound recognition circuit 15 or image recognition signals from the image recognition circuit 16 in response to requests from the main CPU 201.

On the basis of sound recognition signals or image recognition signals provided by the sub-CPU 204, the main CPU 201 controls changes in the expression of the character(s) appearing on the game screen, or performs image control pertaining to game development, for example.

The picture block 21 comprises a first VDP (Video Display Processor) 220 for rendering TV game polygon data characters and polygon screens overlaid on the background image, and a second VDP 230 for rendering scrolling background screens, performing image synthesis of polygon image data and scrolling image data based on priority (image priority order), performing clipping, and the like.

The first VDP 220 houses a system register 220*a*, and is connected to the VRAM (DRAM) 221 and to two frame buffers 222 and 223. Data for rendering the polygons used to represent TV game characters is sent to the first VDP 220 through the main CPU 201, and the rendering data written to the VRAM 221 is rendered in the form of 16- or 8-bit pixels to the rendering frame buffer 222 (or 223). The data in the rendered frame buffer 222 (or 223) is sent to the second VDP 230 during display mode. In this way, buffers 222 and 223 are used as frame buffers, providing a double buffer design for switching between rendering and display for each individual frame. Regarding information for controlling rendering, the first VDP 220 controls rendering and display in accordance with the instructions established in the system register 220*a* of the first VDP 220 by the main CPU 201 via the SCU 200.

The second VDP 230 houses a register 230*a* and color RAM 230*b*, and is connected to the VRAM 231. The second VDP 230 is connected via the bus 207 to the first VDP 220 and the SCU 200, and is connected to picture output terminals Voa through Vog through memories 232*a* through 232*g* and encoders 260*a* through 260*g*. The picture output terminals Voa through Vog are connected through cables to the display 7 and the satellite displays 10.

Scrolling screen data for the second VDP 230 is defined in the VRAM 231 and the color RAM 230*b* by the CPU 201 through the SCU 200. Information for controlling image display is similarly defined in the second VDP 230. Data defined in the VRAM 231 is read out in accordance with the contents established in the register 230*a* by the second VDP 230, and serves as image data for the scrolling screens which portray the background for the character(s). Image data for each scrolling screen and image data of texture-mapped polygon data sent from the first VDP 220 is assigned display priority (priority) in accordance with the settings in the register 230*a*, and the final image screen data is synthesized.

Where the display image data is in palette format, the second VDP 230 reads out the color data defined in the color RAM 230*b* in accordance with the values thereof, and produces the display color data. Color data is produced for each display 7 and 9 and for each satellite display 10. Where display image data is in RGB format, the display image data is used as—is as display color data. The display color data is temporarily stored in memories 232*a*–232*f* and is then output to the encoders 260*a*–260*f*. The encoders 260*a*–260*f* produce picture signals by adding synchronizing signals to the image data, which is then sent via the picture output terminals Voa through Vog to the display 7 and the satellite displays 10. In this way, the images required to conduct an interactive game are displayed on the screens of the display 7 and the satellite displays 10.

The sound block 22 comprises a DSP 240 for performing sound synthesis using PCM format or FM format, and a CPU 241 for controlling the DSP 240. Sound data generated by the DSP 240 is converted into 2-channel sound signals by a D/A converter 270 and is then presented to audio output terminals Ao via interface 271. These audio output terminals Ao area connected to the input terminals of an audio amplification circuit. Thus, the sound signals presented to the audio output terminals Ao are input to the audio amplification circuit (not shown). Sound signals amplified by the audio amplification circuit drive the speakers 16*a* and 16*b*.

The subsystem 23 comprises a CD-ROM drive 19*b*, a CD-I/F. 280, and CPU 281, an MPEG-AUDIO section 282, and an MPEG-PICTURE section 283. The subsystem 23 has the function of reading application software provided in the form of a CD-ROM and reproducing the animation. The CD-ROM drive 19*b* reads out data from CD-ROM. The CPU 281 controls the CD-ROM drive 19*b* and performs error correction on the data read out by it. Data read from the CD-ROM is sent via the CD-I/F 280, bus 206, and SCU 200 to the main CPU 201 which uses it as the application software. The MPEG-AUDIO section 282 and the MPEG-PICTURE section 283 are used to expand data that has been compressed in MPEG (Motion Picture Expert Group) format. By using the MPEG-AUDIO section 282 and the MPEG-PICTURE section 283 to expand data that has been compressed in MPEG format, it is possible to reproduce motion picture.

The sound recognition circuit 15 is connected to microphones 13 for converting sounds issued by players into sound signals. The sound recognition circuit 15 performs sound recognition processing on sound signals from the microphones 11 and outputs recognition signals reflecting recognition outcomes to the sub-CPU 204.

The image recognition circuit 16 is connected to the CCD cameras 14 for converting player actions into picture signals. Picture signals from the CCD cameras 14 are analyzed and image recognition signals are output to the sub-CPU 204.

(Operation as Sound Processing Device)

Figure 5:
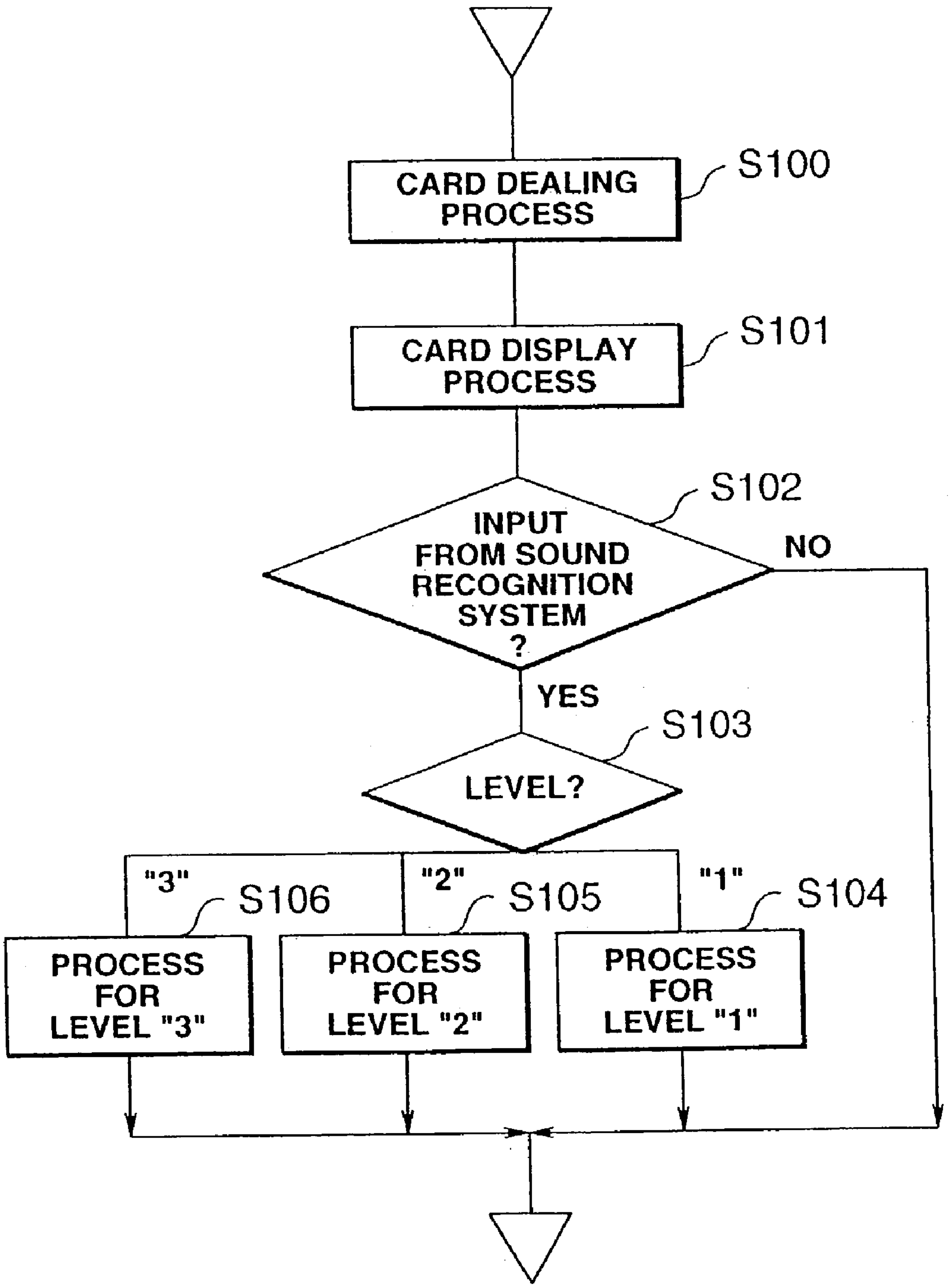
FIG. 5 is a flow chart for sound processing.
Figures 6A, 6B, 6C, 6D, 6E, 6F:
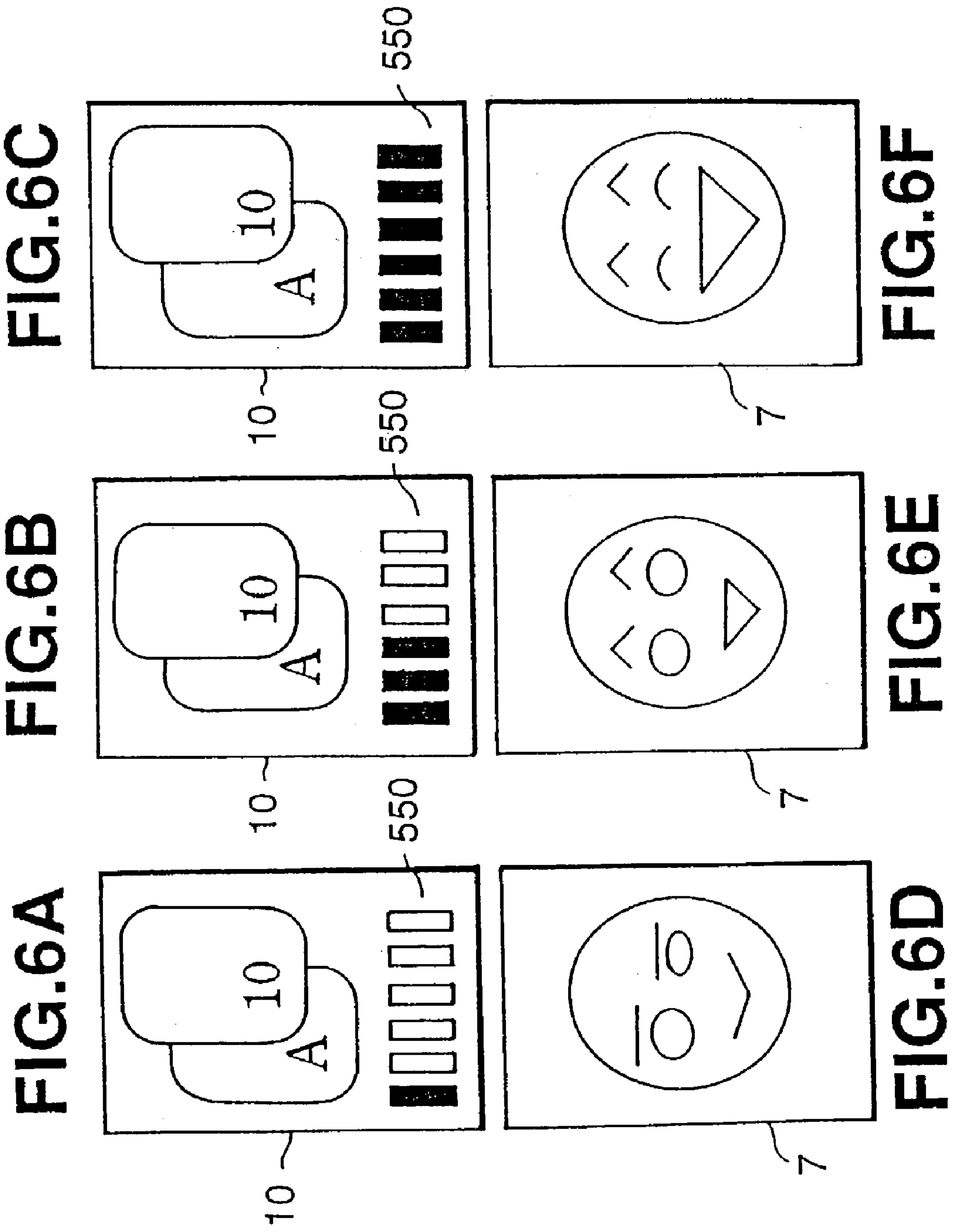
FIG. 6 is an illustrative diagram depicting an example of a screen shown on a display.
Figure 7:
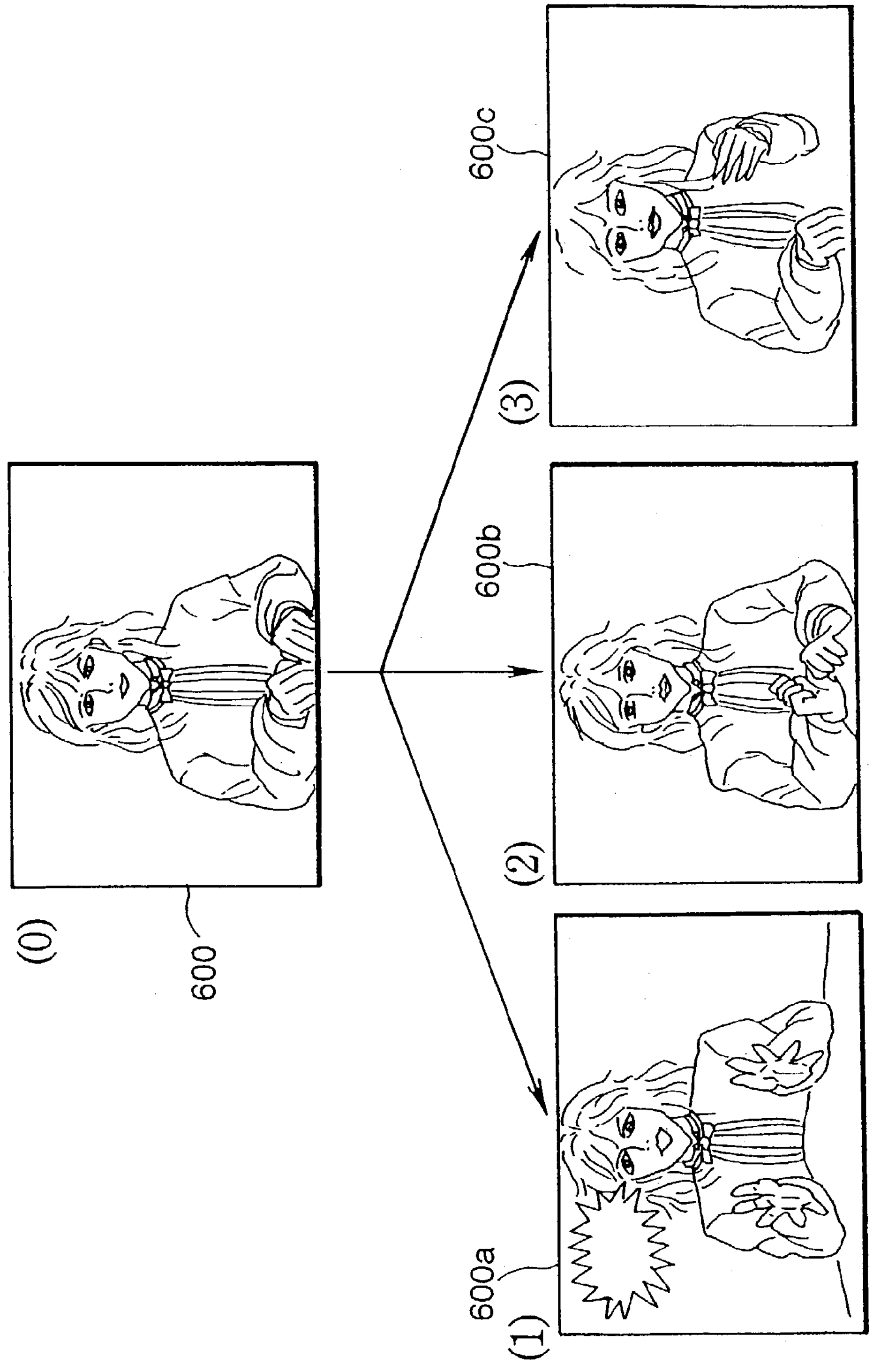
FIG. 7 is an illustrative diagram depicting another example of a screen shown on a display.

The operation of an embodiment constituted in the manner described above will be illustrated referring to FIGS. 5 and 7 on the basis of FIGS. 1 through 4. FIG. 5 is a flow chart illustrating operation wherein the game device functions as a sound processing device. FIGS. 6 and 7 are illustrative diagrams depicting examples of screens produced on the displays by the sound processing device.

Let it now be supposed that an interactive game involving a character representing a dealer, shown on the display 7, and players located at the satellites 3 is in progress. The main CPU 201 executes the game program, and the dealer shown on the display 7 deals out cards to the players (step (S)100 in FIG. 5). The main CPU 201 performs display control of the picture block 21, whereby picture signals are produced in the picture block 21 and these picture signals are delivered to the satellite displays 10 located in front of the players (S101). Let it be assumed that an "A" card and a "10" card are shown on a satellite display 10 see FIG. 6(*a*), for example).

The sound recognition circuit 15 acquires picture signals from the microphones 13 and performs the sound recognition process. Specifically, the sound recognition circuit 15 recognizes which of prescribed reference level bands the level of an input sound signal corresponds to, and outputs the sound recognition outcome as sound recognition signals having a sound signal level "1", a sound signal level "2", or a sound signal level "3". A sound signal level "1" indicates that the sound signal level falls below a first threshold value SHa, a sound signal level "2" indicates that the sound signal level falls above the first threshold value and below a second threshold value SHb, and sound signal level "3" indicates that the sound signal level falls above the second threshold value SHb. The relationship SHa<SHb holds between threshold value SHa and threshold value SHb. In EMBODIMENT 1, sound signal level is used, but it would be possible to use sound frequency level or differences in pitch as well. The sound recognition signals are presented by the sound recognition circuit 15 to the main CPU 201 through the sub-CPU 204.

The main CPU 201 ascertains whether there is sound recognition signal input from the sound recognition circuit 15 via the sub-CPU 204 (S102). In the event that there is sound recognition signal input from the sound recognition circuit 15 (S102; YES), the main CPU implements game development in response to the next sound recognition signal (S104–S106).

(Operation of Sound Signal Level 1 when Given Cards are Distributed)

Let it be assumed, for example, that the satellite display 10 of a certain player shows an "A" card and a "10" card, as depicted in FIG. 6(*a*), and the player makes a sound. The sound is converted into a sound signal by the microphone 13 and is input to the sound recognition circuit 15. In the sound recognition circuit 15 it is recognized which of prescribed reference level bands the level of the sound signal corresponds to, and a sound recognition signal of sound signal level "1" indicating a sound recognition outcome below the first threshold value SHa is input to the sub-CPU 204. The main CPU then moves on to the next process (S102; YES).

Specifically, in the event that the sound recognition signal is level "1" (S103; "1"), the main CPU 201 displays a level "1" on the indicator 550 located on the satellite display 10, and expression data "1" for a dealer expression like that depicted in FIG. 6(*d*) is selected for display on the display 7 (step 104). Specifically, the process involves the main CPU 201 giving an image creation instruction to the picture block 21 based on the sound recognition signal (level "1"), whereupon image data for display as a screen 600 of a female dealer having the expression shown in FIG. 7(0), for example, is modified to image data for displaying a screen 600*a* of the dealer with the expression shown in FIG. 7(1).

(Operation of Sound Signal Level 2 when Given Cards are Distributed)

Let it be assumed that in similar fashion the satellite display 10 of a certain player shows an "A" card and a "10" card, as depicted in FIG. 6(*a*) (see FIG. 6(*b*)), and the player makes a sound. Let it further be assumed that the sound recognition output from the sound recognition circuit 15 is a level "2" sound recognition signal. The sound recognition signal is provided to the main CPU 201 through the sub-CPU 204. The main CPU 201 displays a level "2" on the indicator 550 located on the satellite display 10, and expression data "2" for a dealer expression like that depicted in FIG. 6(*e*) is selected for display on the display 7 (step 105). Specifically, the process involves the main CPU 201 giving an image creation instruction to the picture block 21 based on the sound recognition signal (level "2"), whereupon image data for display as a screen 600 of a female dealer having the expression shown in FIG. 7(0), for example, is modified to image data for displaying a screen 600*b* of the dealer with the expression shown in FIG. 7(2).

(Operation of Sound Signal Level 3 when Given Cards are Distributed)

Let it be assumed that in similar fashion the satellite display 10 of a certain player shows an "A" card and a "10" card, as depicted in FIG. 6(*a*) (see FIG. 6(*c*)), and the player makes a sound. Let it further be assumed that the sound recognition output from the sound recognition circuit 15 is a level "3" sound recognition signal. The sound recognition signal is provided to the main CPU 201 through the sub-CPU 204. The main CPU 201 displays a level "3" on the indicator 550 located on the satellite display 10, and expression data "3" for a dealer expression like that depicted in FIG. 6(*f*) is selected for display on the display 7 (step 106). Specifically, the process involves the main CPU 201 giving an image creation instruction to the picture block 21 based on the sound recognition signal (level "3"), whereupon image data for display as a screen 600 of a female dealer having the expression shown in FIG. 7(*a*), for example, is modified to image data for displaying a screen 600*c* of the dealer with the expression shown in FIG. 7(3).

Actions like the three above continue, and when development thereof is complete (S104–106) the main CPU 201 exits the routine and proceeds to other processes.

By employing the game device as a sound processing device in the manner described above, for given cards that have been dealt, according to the psychological state of the player, i.e., when the player is winning and feeling good the psychological state tends to be elated, the sound level to be greater, and the pitch to be higher, while when the player is losing and feeling bad the psychological state tends to be depressed, the sound level to be lower, and the pitch to be lower, whereby the tone of sound of the player can be reflected in the development of the game by the game device, making possible operation just as if the player were capable of conversation with the dealer shown in the display 7. Accordingly, using the sound processing device described above, there is provided a personal game device with enhanced interactivity.

According to EMBODIMENT 1 described above, the sound recognition circuit 15 performs sound recognition in response to the level of the sound signal input from the microphone, but the invention is not limited thereto, with it also being possible to store various sound patterns, compare input sound signal patterns with the stored sound patterns, perform pattern recognition through matching of patterns that are the same or similar, and output the recognition outcomes as sound recognition signals. While this requires preparing various types of sound patterns, it offers a higher level of interactive processing than does the sound level-based sound recognition described above.

According to EMBODIMENT 1 described above, the game develops as images are changed on the basis of sound recognition signals, but it would also be possible to vary game outcomes corresponding to sound recognition signals.

(Embodiment 1 as Image Processing Device)

Figure 8:
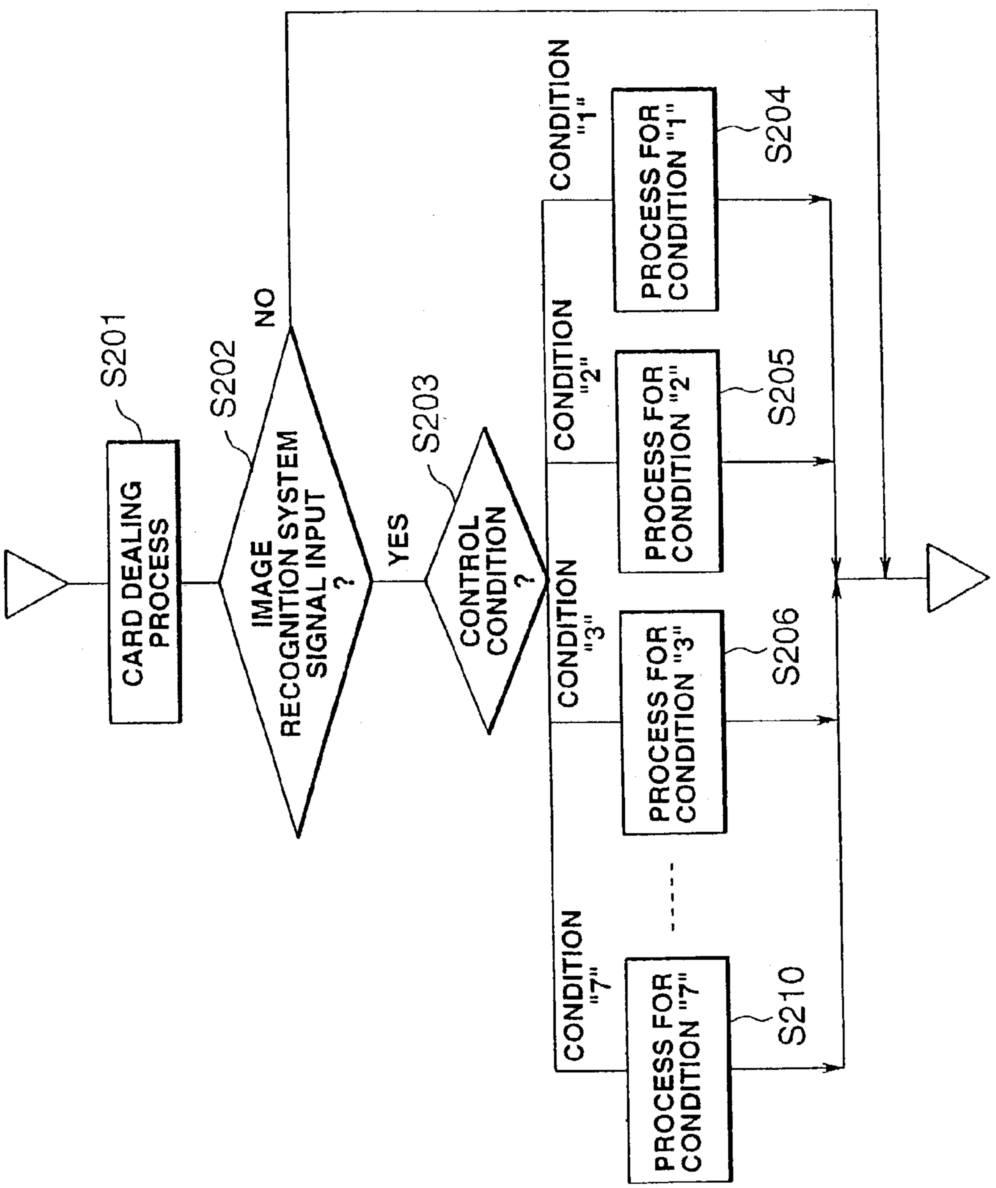
FIG. 8 is a flow chart for image processing.

FIG. 8 is a flow chart for illustrating image process device operation. First, as recited earlier, the CCD cameras 14 are arranged at prescribed locations on the forward extending section 4 in such a way that the control faces of the satellites 3 may be monitored.

Picture signals of the control faces caught by the CCD cameras 14 are input to an image recognition circuit 16, for example. The image recognition circuit 16 contains various stored image patterns, and selects from among these image patterns one that approximates the picture signal input through a CCD camera 14. The image recognition circuit 16 inputs an image recognition signal reflecting the image recognition outcome thereof to the sub-CPU 204. The sub-CPU 204 presents the acquired sub-CPU 204 image recognition signal to the main CPU 201. For example, let it be assumed that the satellite display 10 of a player shows an "A" card and a "10" card, as shown in FIG. 6(*a*). The player performs prescribed operations on the control face while looking at the cards. Players use hand movements on the control face to instruct commands such as "bet", "call", etc.

A player's hand movements on the control face are captured by the CCD cameras 14 and input to the image recognition circuit 16. The image recognition circuit 16 executes an image recognition process to ascertain which of a number of stored patterns the input image resembles. Through the sub-CPU 204, the image recognition circuit 16 presents to the main CPU 201 the image recognition signal which is the outcome of the image recognition process. The main CPU 201 executes a bet, call, or other process in response to this image recognition signal.

The main CPU 201 executes the prescribed game processes and deals cards to each player (S201 in FIG. 8). The dealt cards, such as those depicted in FIG. 6(*a*), for example, are shown on the satellite displays 10.

Next, the main CPU 201 ascertains whether there is image recognition signal input from the image recognition circuit 16 (S202). At this point, if the main CPU 201 has been presented with a player control command by the image recognition circuit 16 (i.e., there is an image recognition signal from the image recognition circuit 16) (S202; YES), the main CPU 201 ascertains the nature of the image recognition signal input from the image recognition circuit 16 (S203). Specifically, as regards the main CPU 201, the main CPU 201 is presented with subtle actions resulting from the influence of the psychological state of the player on bets and calls at the control face.

Accordingly, the main CPU 201 executes processes in response to subtly differentiated states corresponding to subtle player movement states "1", "2", . . . , "7" on the control face (S203–S210). Specifically, for a given bet, the main CPU 201 delicately selects the game development corresponding to subtly differentiated player actions (S203–S210).

According to this image processing device, subtle movements by players on the control face are monitored through CCD cameras 14, and subtle variations in input player commands are used to determine development of the game, thereby allowing input player commands, such as bets or calls, from waving of the hands, for example, thus affording a game device affording more realistic game development.

According to EMBODIMENT 1, the image recognition process format employs a combination of CCD cameras 14 and an image recognition circuit 16, but the invention is not limited thereto, and may comprise an imaging module comprising a MOS imaging element integrated with an image processing section for performing image recognition of picture signals from the MOS imaging element and outputting image recognition signals.

Embodiment 2

Figure 9:
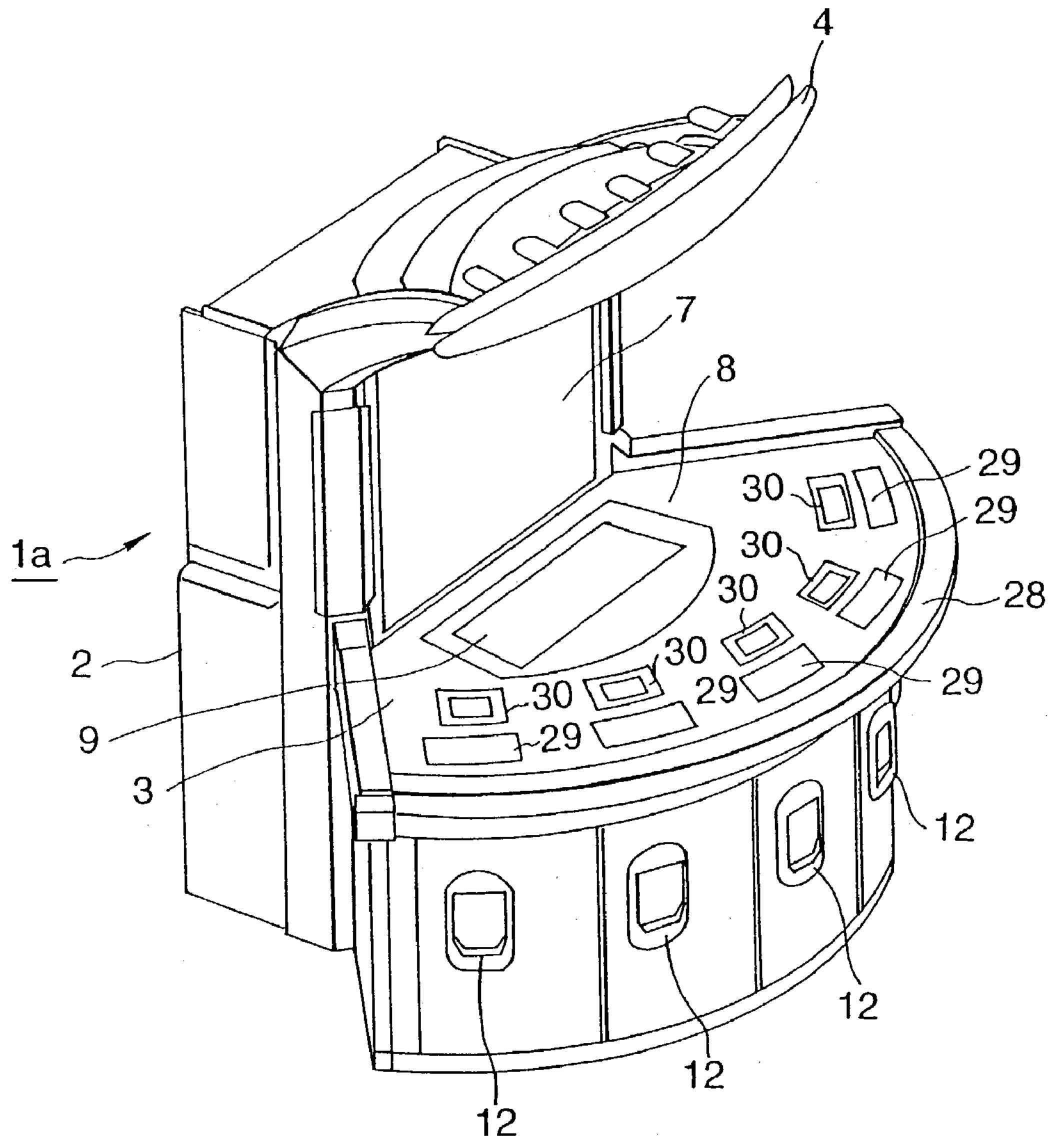
FIG. 9 is a perspective view depicting the game device of EMBODIMENT 2 of the present invention.
Figure 10:
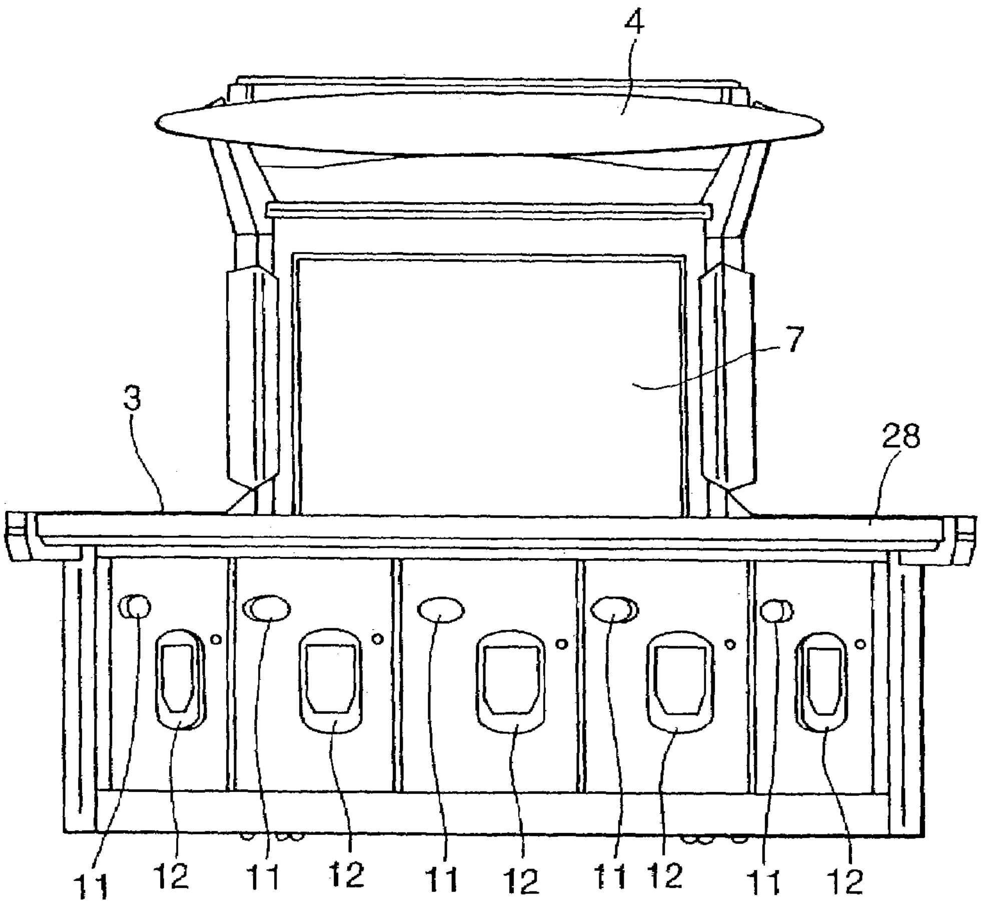
FIG. 10 is a front view of the game device of EMBODIMENT 2.
Figure 11:
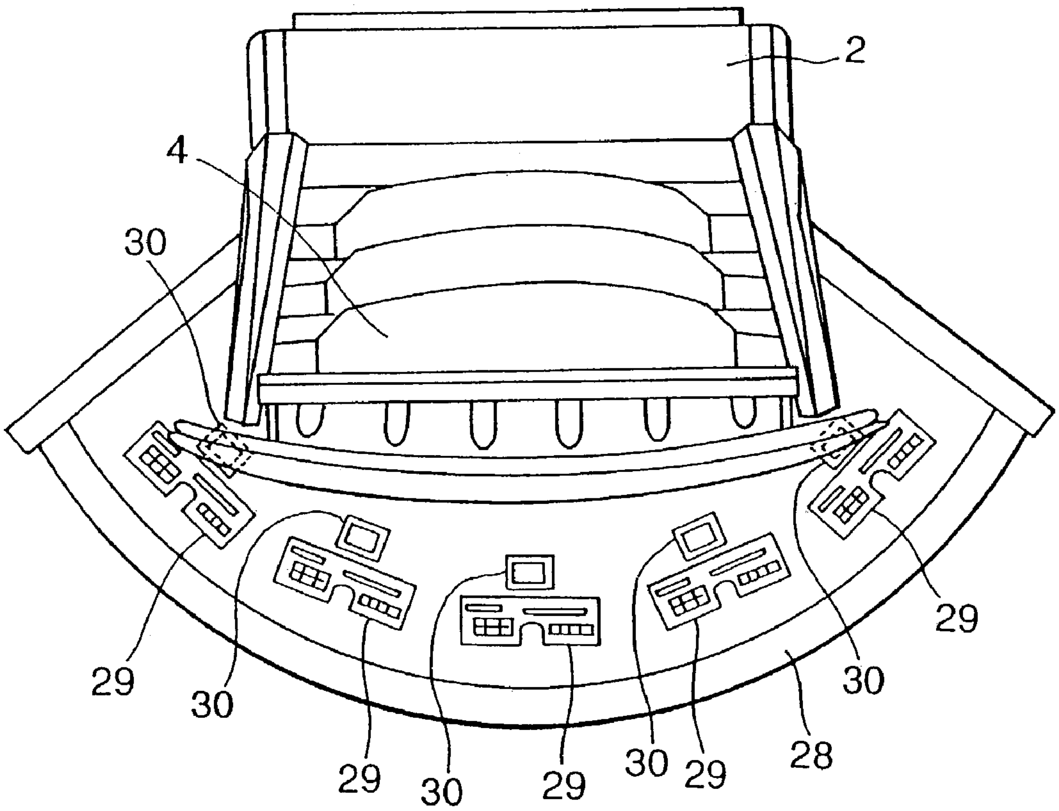
FIG. 11 is a plan view of the game device of EMBODIMENT 2.
Figure 12:
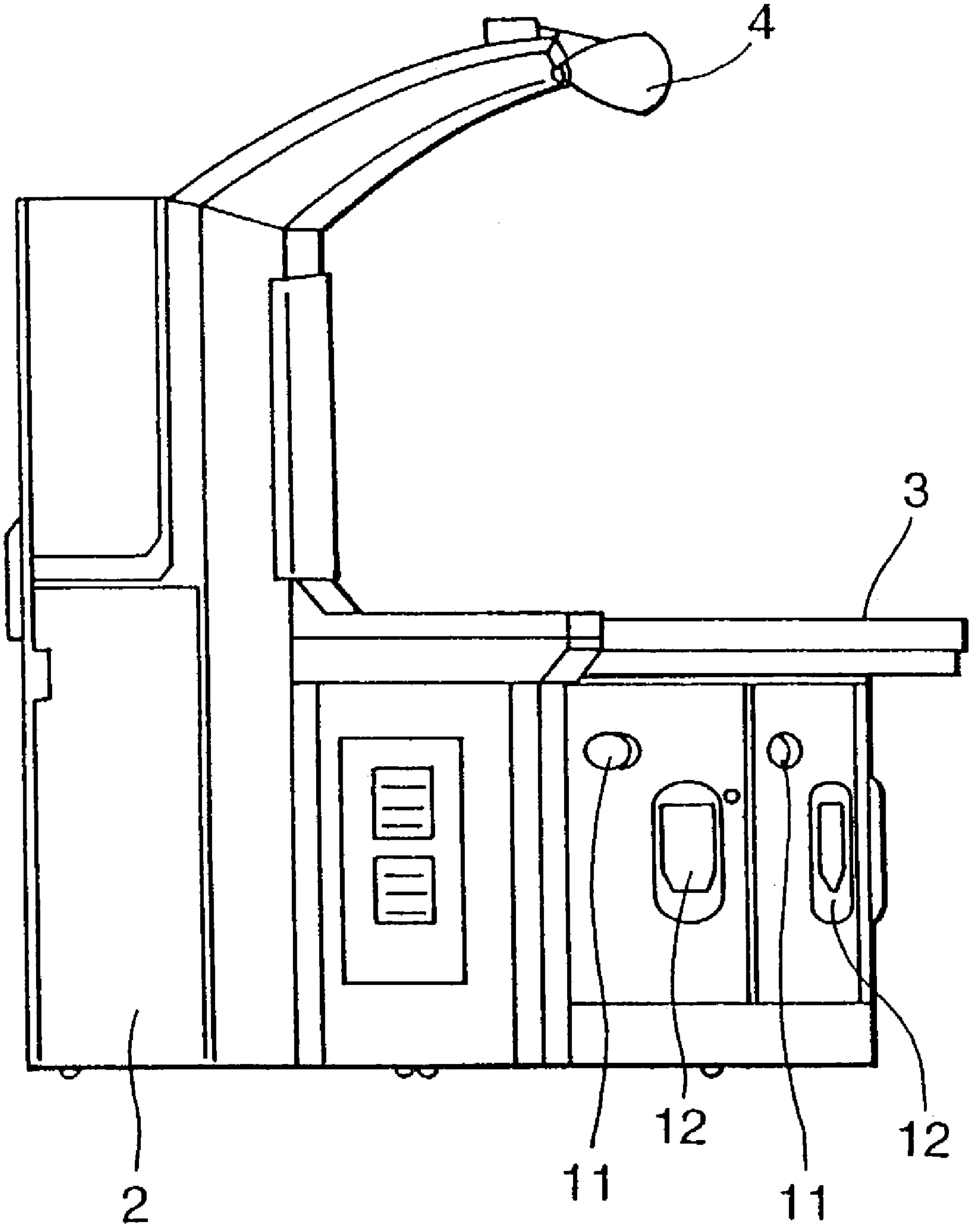
FIG. 12 is a side view of the game device of EMBODIMENT 2.

EMBODIMENT 2 of the present invention is illustrated in FIGS. 9 through 18. FIG. 9 is a perspective view of the game device of EMBODIMENT 2 of the present invention, FIG. 10 is a front view of the game device, FIG. 11 is a plan view of the game device, and FIG. 12 is a side view of the game device.

In EMBODIMENT 2 depicted in these drawings, elements identical to those in EMBODIMENT 1 are assigned the same symbols and description is omitted where redundant. The interactive game device 1*a* of EMBODIMENT 1 differs significantly from EMBODIMENT 1 in that simple optical control input means (optical input means) 30 capable of readily ascertaining movements of the player's arms and the like are used in place of the cameras 14 in EMBODIMENT 1. According to EMBODIMENT 2, there is also provided control indicator panels (control means) 29 for auxiliary control of the optical control input means 30 or for inputting the commands required to play the game without the need to use the optical control input means, a further aspect differing from EMBODIMENT 1. A further aspect differing from EMBODIMENT 1 is the provision in EMBODIMENT 2 of an armrest 28 so that players can relax while playing the game. According to EMBODIMENT 2, the provision of the token insertion slots 11 and token receptacles 12 to the side panel of the housing 5 on the players' side, tokens being inserted through the token insertion slots 11 and tokens being dispensed into the token receptacle 12 of the winning player in the event that he or she wins the game, is a further aspect differing from EMBODIMENT 1. According to EMBODIMENT 2, the elements described above differ from EMBODIMENT 1, with other elements being analogous to EMBODIMENT 1.

Figure 13:
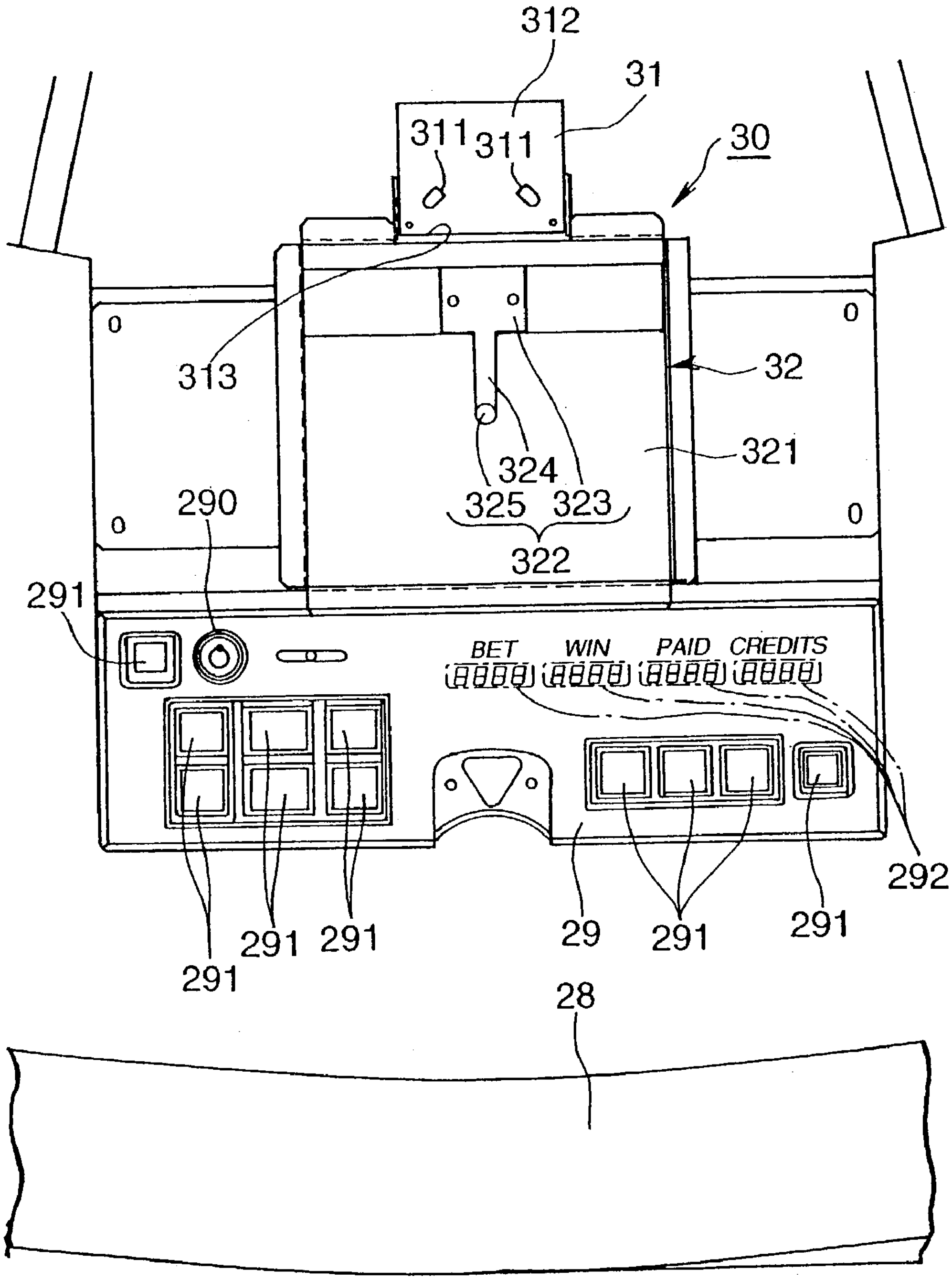
FIG. 13 is a plan view depicting details of the control section of a satellite component of the game device of EMBODIMENT 2.
Figure 14:
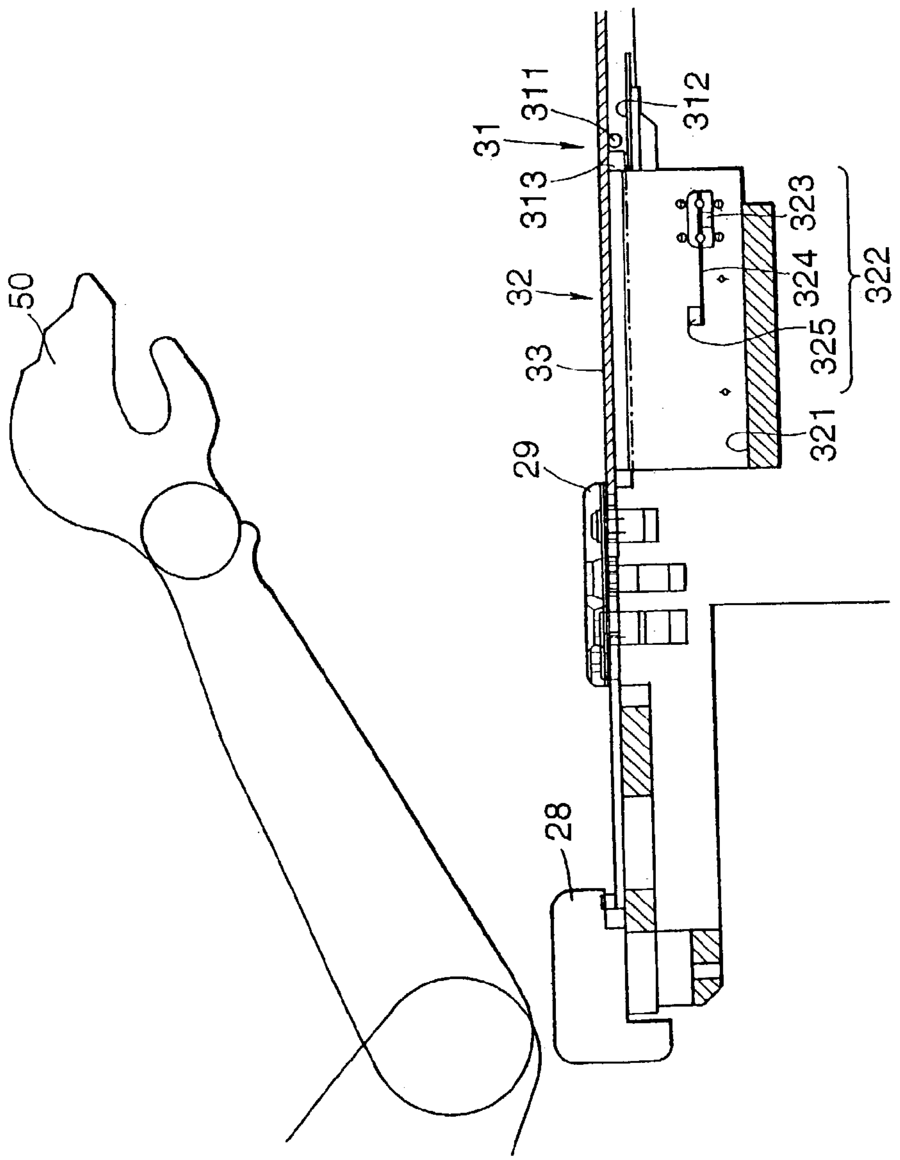
FIG. 14 is a sectional view of the control section in EMBODIMENT 2.

FIG. 13 is a plan view depicting details of the control section of a satellite component of the game device, and FIG. 14 is a sectional view of the control section.

According to EMBODIMENT 2 satellites 3 are provided with an optical control input means 30 and a control indicator panel 29. The constitution of the control indicator panel 29 and the optical control input means 30 is described below.

Turning first to the constitution of the control indicator panel 29, the control indicator panel 29 comprises a key switch 290, a push button 291 for entering commands required to play the game, and a display panel 292 for displaying BET, WIN, PAID, CREDITS, and the like.

Turning next to the constitution of the optical control input means 30, the optical control input means 30 broadly comprises a photoemitter section 31 for emitting infrared light into a prescribed space, and a photoreceptor section 32 for photoreception of this infrared light reflected in accordance with player hand movements in a prescribed space. This light emitting section 31 comprises an LED substrate 312 provided with two ultraviolet light-emitting diodes (LEDs) 311. The photoemitter section 31 is located on the upward projecting section 2 side. The LED substrate 312 of the light emitting section 31 is arranged on the horizontal, with the LEDs 311 arranged on an incline so that the emitting ends thereof emit infrared light towards a prescribed space on the players' side. At the emitting ends of the LEDs 311 (photoreceptor section 32 side) there is provided a light blocking plate 313 for preventing infrared light emitted by the LEDs 311 from directly hitting the photoreceptor section 32. A prescribed direct current is delivered to the LEDs 311 so that ultraviolet light can be emitted by the LEDs 311.

The photoreceptor section 32 comprises a dark box 321 comprising a bottomed box of cubic shape and a photoreceptor substrate 322 provided on the inside of the dark box 321. The inside walls of the dark box 321 have a black finish in order to prevent the production of reflected light. The photoreceptor substrate 322 comprises a fixed end plate 323, a support piece 324 projected from this fixed end piece, and an infrared sensor unit 325 provided to the support piece 324. As shown in FIGS. 13 and 14, the photoreceptor substrate 322 is arranged with the fixed end plate 323 fixed to one side of the dark box 321 so that the infrared sensor unit 325 is positioned in the center of the dark box 321.

A glass plate 33 is provided over the photoemitter section 31 and the photoreceptor section 32, the glass plate 33 protecting the photoemitter section 31 and the photoreceptor section 32 and facilitating the projection of infrared light and the incidence of reflected light.

Figure 15:
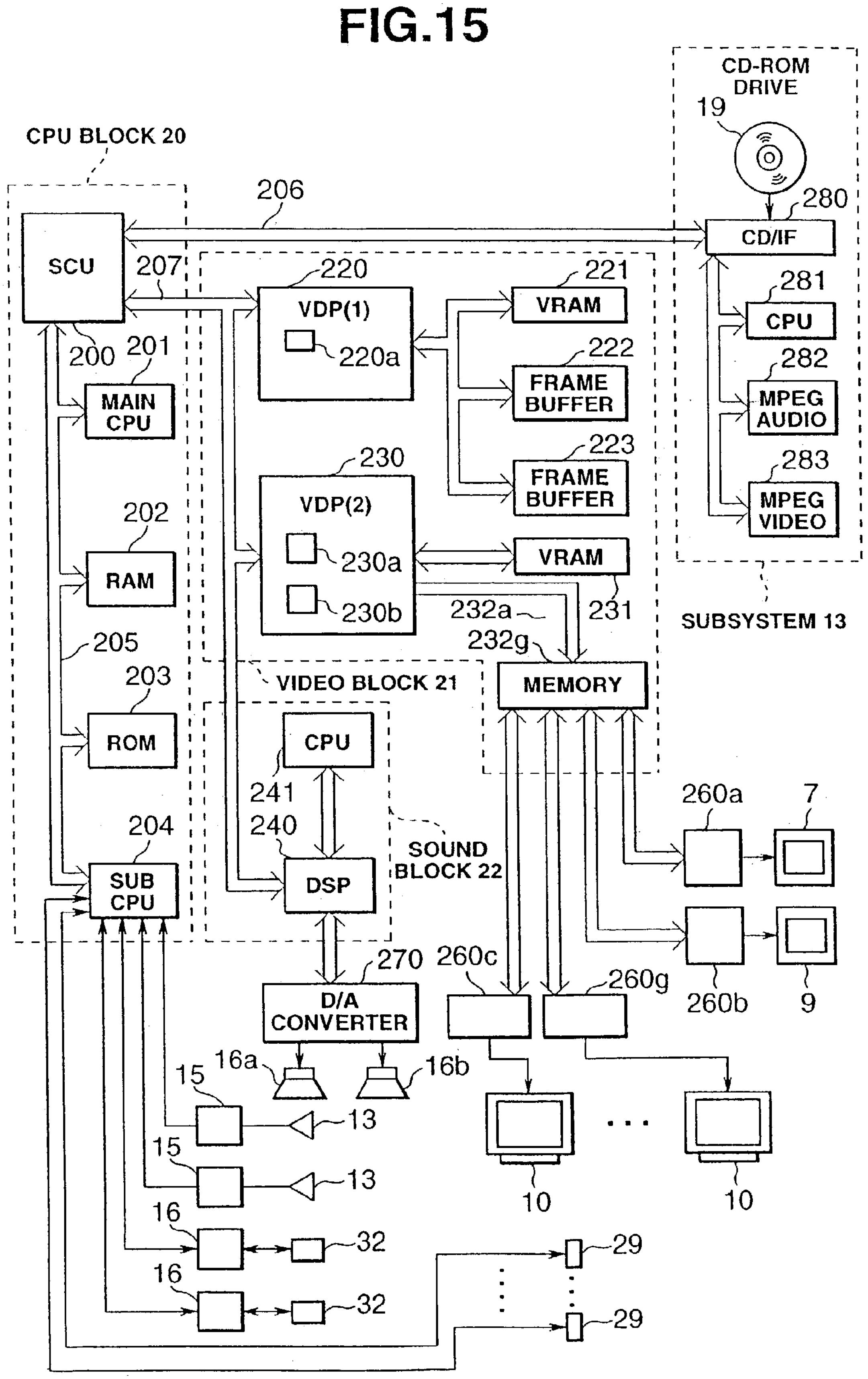
FIG. 15 is a block diagram outlining the processing system of the game device pertaining to EMBODIMENT 2.

FIG. 15 is a block diagram outlining the processing system of the game device pertaining to EMBODIMENT 2. The housing of the game device of EMBODIMENT 1 is analogous to that in EMBODIMENT 1 in that it comprises a CPU block 20 for controlling the whole device, a picture block 21 for controlling the game screen display, a sound block for producing effect sounds and the like, and a subsystem for reading out CD-ROM.

In place of the CCD cameras 14 and image recognition circuit 16 of EMBODIMENT 1 the game device of EMBODIMENT 2 is provided with a control indicator panel 29, optical control input means 30, and waveform forming circuits 35. Other elements of the game device of EMBODIMENT 2 are analogous to the game device of EMBODIMENT 1, so descriptions of these elements are omitted.

Signals from the infrared sensor units 325 are subjected to waveform forming by the waveform forming circuits 35 and are then input to the sub-CPU 204. The sub-CPU 204 is electrically connected to the control indicator panels 29. Control commands entered using the push buttons 291 on the control indicator panels 29 are presented to the main CPU 201 through the sub-CPU 204. Display commands from the main CPU 201 are sent to the display panels 292 of the control indicator panels 29 for displaying on the display panels 292 BET, WIN, PAID, and CREDITS messages.

Figure 16:
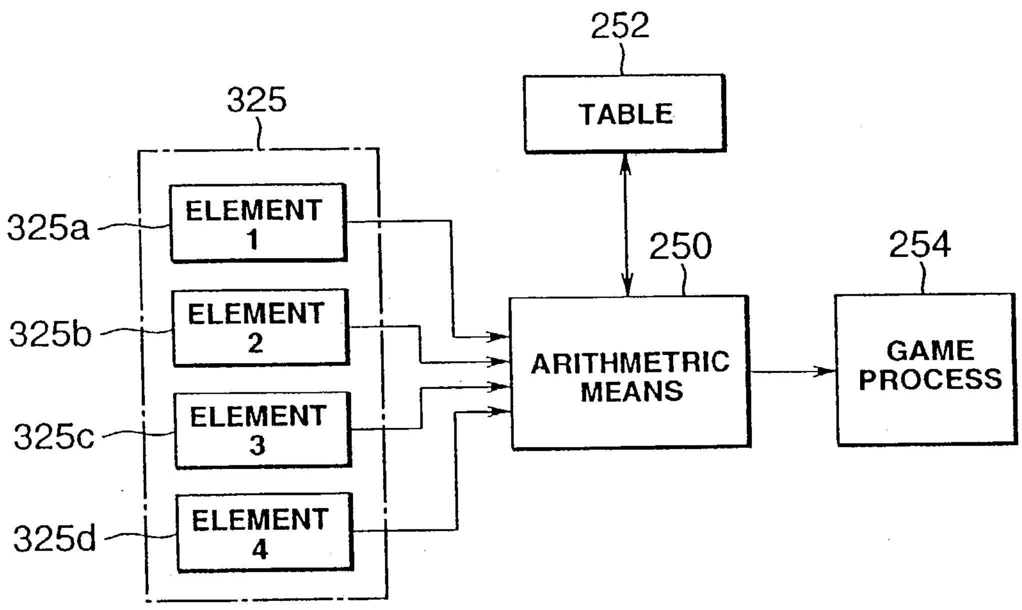
FIG. 16 is a block diagram depicting the processing system for signals from the photoreceptor section in EMBODIMENT 2.

FIG. 16 is a block diagram depicting the processing system for signals from the photoreceptor section 32. Each infrared sensor unit 325 comprises four infrared photoreceptor elements 325*a*, 325*b*, 325*c*, and 325*d*. These four infrared photoreceptor elements 325*a*, 325*b*, 325*c*, and 325*d* are arranged within a space partition divided into four. Photoreceptor-signals from the infrared photoreceptor elements 325*a*, 325*b*, 325*c*, and 325*d* are input to arithmetic means 250. The arithmetic means 250 compares the input signals to a table 252, and comparison outcomes are provided to the game process 254. FIG. 16 simply notes signal flow; specific circuitry and devices such as the waveform forming circuits 35 are not shown.

From the balance and proportions or unbalance and differentials among the values of sensor signals from the elements 325*a*, 325*b*, 325*c*, and 325*d* and signal magnitudes from the elements 325*a*, 325*b*, 325*c*, and 325*d*, the arithmetic means 250 can refer to data in the table 252 to compute player arm orientation, position, and other arm movements. The arithmetic means 250 gives this player arm movement to the game processor means 254. The game processor means 254 displays images of results of prescribed arithmetic outcomes as game screens. Accordingly, through this format the control commands required to advance the game can be provided to the game processor means 254 without operating the control indicator panel 29.

The arithmetic means 250 and the game processor means 254 are actualized through the main CPU 120, which operates in accordance with the prescribed program stored on CD-ROM 19, in RAM 202, or in ROM 203. The table 252 is stored ROM 203, on CD-ROM 19, or in RAM 202.

Figure 17:
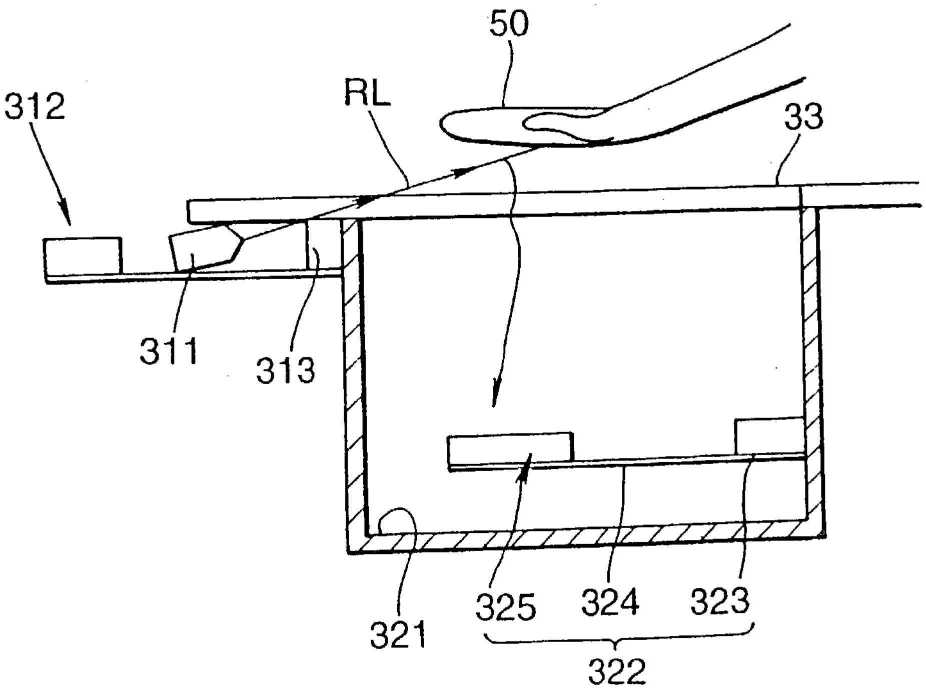
FIG. 17 is an illustrative diagram illustrating photoreception by the photoreceptor element of infrared light emitted by a photoemitter element in EMBODIMENT 2.
Figure 18:
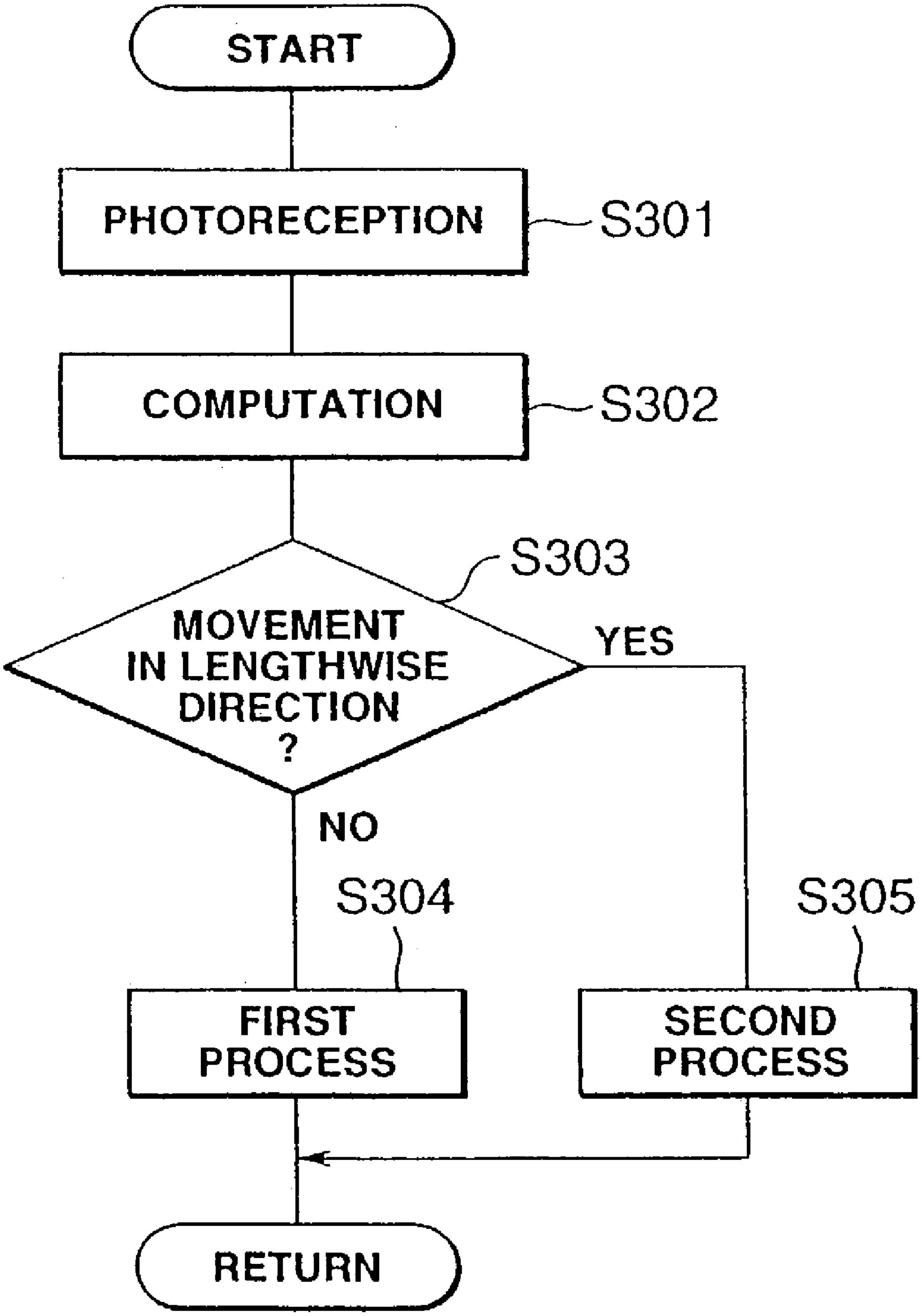
FIG. 18 is a flow chart for illustrating processing of signals from the photoreceptor element in EMBODIMENT 2.

The operation of EMBODIMENT 2 will be described referring to FIGS. 9 through 18. FIG. 17 is an illustrative diagram for illustrating photoreception by a photoreceptor element of infrared light emitted by a photoemitter element. FIG. 18 is a flow chart for illustrating processing of signals from a photoreceptor element.

Referring to FIG. 17, infrared light RL emitted by the two LEDs of the photoemitter section 31 exits to the outside through the glass plate 33.

In order for a player to provide the game device with the commands required for advancing the game, he or she moves his or her hand 50 in a prescribed direction over the photoreceptor section 32 (in the sideways direction or lengthwise direction, for example), as depicted in FIGS. 14 and 17.

The infrared light RL emitted by the LEDs 311 is reflected by the player's hand 50 and is reflected back through the glass plate 33 and into the infrared sensor unit 325 in the manner illustrated in FIG. 17. This reflected light accords with movements of the player's hand 50, producing differences in relative light reception among the four photoreceptor elements 325*a*, 0.325*b*, 325*c*, and 325*d* of the infrared sensor unit 325 receiving the reflected light.

Signals from the photoreceptor elements 325*a*, 325*b*, 325*c*, and 325*d* are acquired by the arithmetic means 250 (S301 in FIG. 18). Thereafter, the arithmetic means 250 computes the player's hand 50 movements referring to the table 252 on the basis of the signals (S302 in FIG. 18).

Where the outcome of the computation of the player's hand 50 movements in step S302 indicates sideways motion of the hand 50, for example (step S303 in FIG. 18; NO), the arithmetic means 250 issues an instruction to execute a first process to the game processing means 254 (S304 in FIG. 18).

Where the outcome of the computation of the player's hand 50 movements in step S302 indicates lengthwise motion of the hand 50, for example (step S303 in FIG. 18; YES), the arithmetic means 250 issues an instruction to execute a second process to the game processing means 254 (S305 in FIG. 18).

(Embodiment 2 Variant)

According to EMBODIMENT 2 as taught above, the game processing means 254 executes two processes depending on the player's hand 50 movements; however it would be possible to sense subtle changes in player's hand 50 movements using the photoemitter section 31, photoreceptor section 0.32, arithmetic means 250, and table 252 of EMBODIMENT 2 and to simulate the subtleties of the player's interior psychological state in a manner analogous to EMBODIMENT 1.

While the aspect of game processing through sound was not described in the context of EMBODIMENT 2, game processing through sound is conducted analogously to EMBODIMENT 1.

According to EMBODIMENT 2, the photoemitter section 31 comprises two LEDs 311, but it would be possible to provide more than two LEDs, such as four or six, for example.

(Other Variant)

Figure 19A:
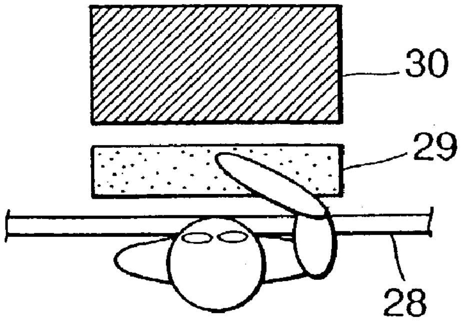
FIG. 19 is an illustrative diagram of an example of placement of the control indicator panel and the optical control input means in a variant of EMBODIMENT 2.
Figure 19B:
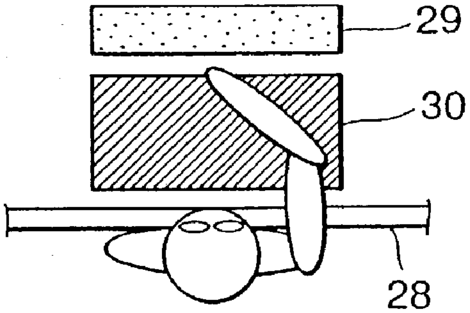

FIGS. 19(*a*) and 19(*b*) depict an example of placement of the control indicator panel and the optical control input means.

According to this variant, the control indicator panel 29 is arranged on the player side and the optical control input means 30 is arranged at a location further distant from the player, as shown in FIG. 19(*a*). Since in this placement the optical control input means 30 is located further away from the player than is the control indicator panel 29, movement of the player's hand 50 to operate the buttons on the control indicator panel 29 is not sensed by the optical control input means 30, even if the player should extend his or her hand 50. Accordingly, in preferred practice placement of the control indicator panel 29 and the optical control input means 30 is that depicted in FIG. 19(*a*).

In an example differing from the variant described above, the optical control input means 30 is arranged on the player side and the control indicator panel 29 is arranged at a location further distant from the player, as shown in FIG. 19(*b*). Since in this placement the optical control input means 30 is located closer to the player side than is the control indicator panel 29, when the player extends his or her hand 50 to operate the buttons on the control indicator panel 29, this movement is sensed by the optical control input means 30. Accordingly, the placement depicted in FIG. 19(*b*) is unfavorable.

Figure 20:
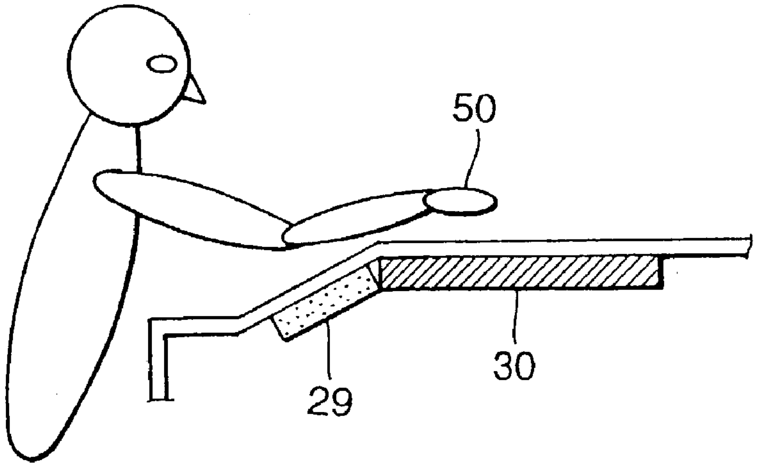
FIG. 20 is a sectional view showing a placement example of the control indicator panel pertaining to a variant of the present invention.

An example of control indicator panel placement is depicted in cross section in FIG. 20. It may be understood from FIG. 20 that placement of the control indicator panel 29 on the player side and placement of the optical control input means 30 at a location further away from the player is preferred. In preferred practice, the control indicator panel 29 is arranged sloping downward towards the player, as shown in FIG. 20. Placement of the control indicator panel 29 in this manner prevents mistaken operation of the control indicator panel 29 when operating the optical control input means 30.

Even where the control indicator panel 29 is not disposed at an angle in the manner described above, mistaken operation of the push button 291 on the control indicator panel 29 when operating the optical control input means 30 may be prevented, provided that the push button 291 on the control indicator panel 29 is recessed below the control face so that the top face of the push button 291 is sufficiently lower than the satellite face.

(Yet Another Variant)

Implementation of the image processing devices of the embodiments described above in a game device gives the ability to incorporate control commands in game development through player gestures, affording a game device that more closely approximates reality.

In the foregoing embodiments, sound processing circuit operation and image processing circuit operation were described separately, but the two may be integrated. Naturally, doing so affords a personal game device offering an even higher level of interactivity.

Embodiment 3

This embodiment shall illustrate a simple optical control input means (optical input means), different from that of EMBODIMENT 2, that readily discerns player arm movements and the like. The arrangement of this optical input means is analogous to that in EMBODIMENT 2.

Figure 21A:
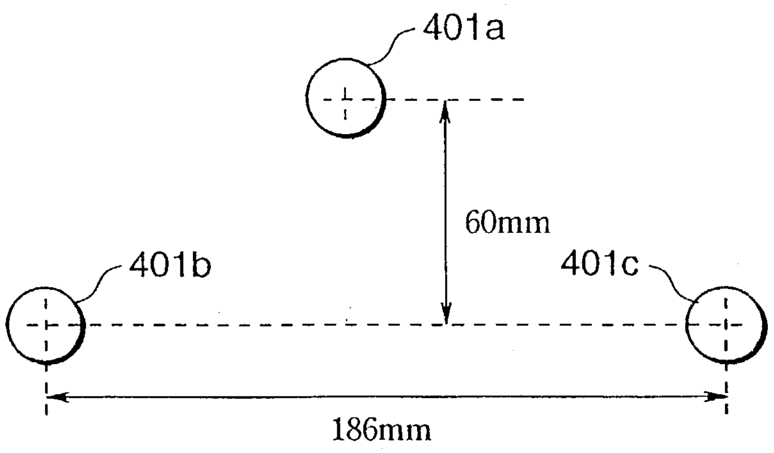
FIG. 21 is a diagram depicting placement of the photoreceptor element in EMBODIMENT 3.
Figure 21B:
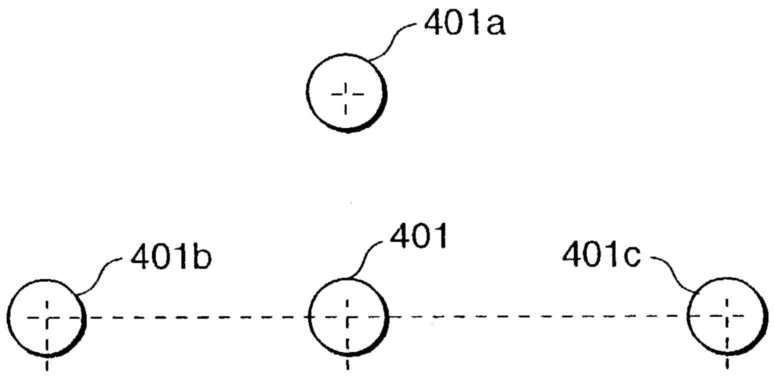
Figure 21C:
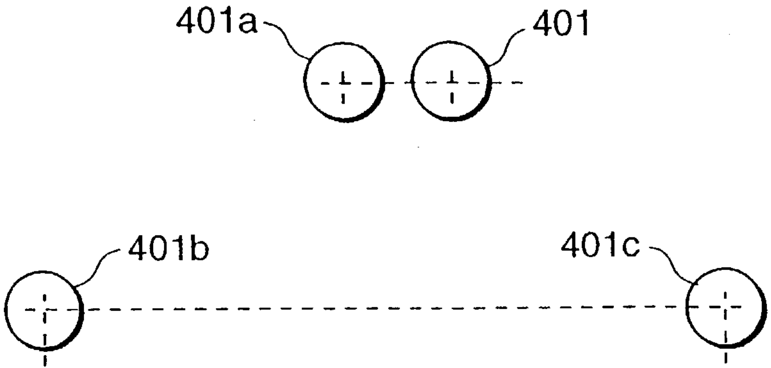

Referring to FIG. 21(*a*), this optical input means comprises three infrared sensors Y (symbol 401*a*), X1, (symbol 401*b*), and X2 (symbol 401*c*). These three sensors are arranged at the apices of an isosceles triangle having a 186 mm base and a height of 60 mm. These sensors can sense relatively distant obstacles (such as a player's hand) through transmission and reception of infrared light. The infrared sensors 401*a–c* transmit infrared light and also receive infrared light reflected from an object to detect the presence or absence of an object. That is, the infrared sensors have both a transmission function and a reception function. Placement of these sensors is suited to sensing hand movements in blackjack.

FIG. 21(*b*) depicts an example in which one additional sensor is placed between sensors 401*b* and 401*c*, and FIG. 21(*c*) depicts an example in which one additional sensor is placed adjacent to sensor 401*a*. The details of sensor operation will be described in detail shortly, after presenting a brief description of the function of the additional sensors shown in FIG. 21(*b*) and FIG. 21(*c*). The additional sensor shown in FIG. 21(*b*) is used for accurate detection of hand movement in the sideways direction (STAND command). A STAND command decision is made where an object is sensed in the order: sensor. 401*b*—>401—>401*c* (or the reverse). Conversely, a STAND command decision is not made where the object is sensed in the order: sensor 401*a*—>401—>401*b* (or 401*c*) (a HIT command, decision, described shortly, is made, for example). The additional sensor in FIG. 21(*c*) is used for accurate detection of movement of the hand placing it in a prescribed location (HIT command). When an object is sensed by either sensor 401*a* or 401, and the sense interval continues for a relatively long period of time, a HIT command is posited. The additional sensor ensures reliable sensing even if hand position is out of place to a certain extent.

Speaking in general terms, increasing the number of sensors has the effect of making possible more accurate sensing, but at the same time requires a more complicated hardware design and process software. The number of sensors and the placement thereof should be selected to provide the required sensor accuracy in as simple a design as possible. The three sensors shown in FIG. 21(*a*) are thought to afford accurate sensing in most cases; however, where STAND commands, HIT commands, or both are not being sensed correctly, the placement of either FIG. 21(*b*), FIG. 21(*c*), or both may be employed.

These sensors are arranged below the decorative panel depicted in FIG. 22. The design must be such that the infrared light emitted by the sensors is not blocked, and should clearly indicate to the player the place where hand action should be performed. Accordingly, the panel is fabricated from a material that is capable of transmitting at least infrared light, such as glass for example. The panel shown in FIG. 22 constitutes a part of the table design, and also explains hand movements for a blackjack game. Specifically, the word "STAND" is shown together with arrows pointing in the lateral direction, indicating that moving the hand sideways at this location produces a STAND (do not require another card) command. The word "HIT" is shown at the top, indicating that placing the hand over this location produces a HIT (require another card) command. The sensor Y (401*a*) is used to sense HIT commands, while the sensors X1 and X2 (401*b, c*) are used to sense STAND commands. Sensor location, characters, and designs are arranged separated by some distance because the printing can block infrared light to a certain degree, and is done in order to avoid this.

Figure 25:
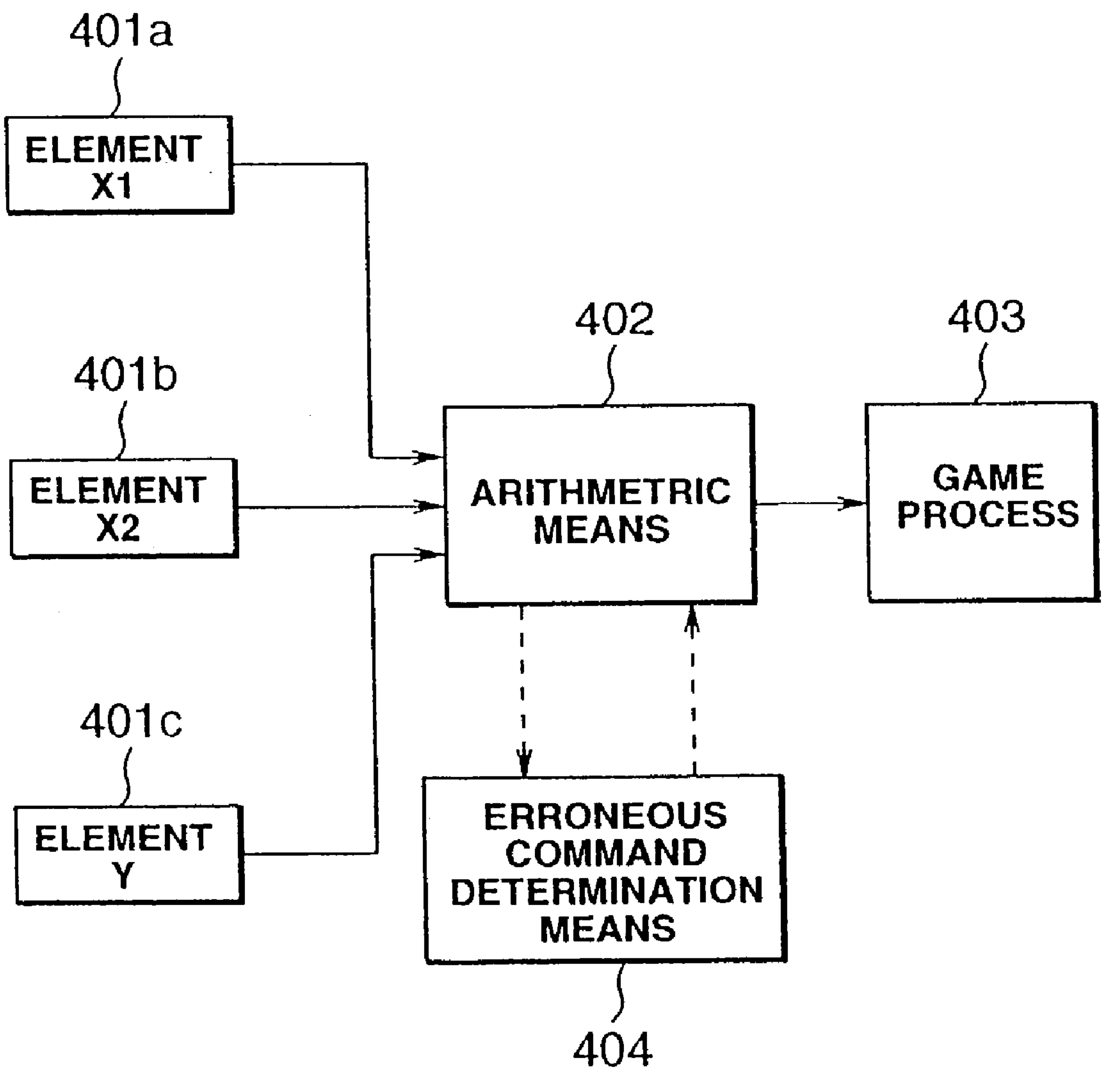
FIG. 25 is a block diagram outlining the processing system of the game device pertaining to EMBODIMENT 3.
Figure 26:
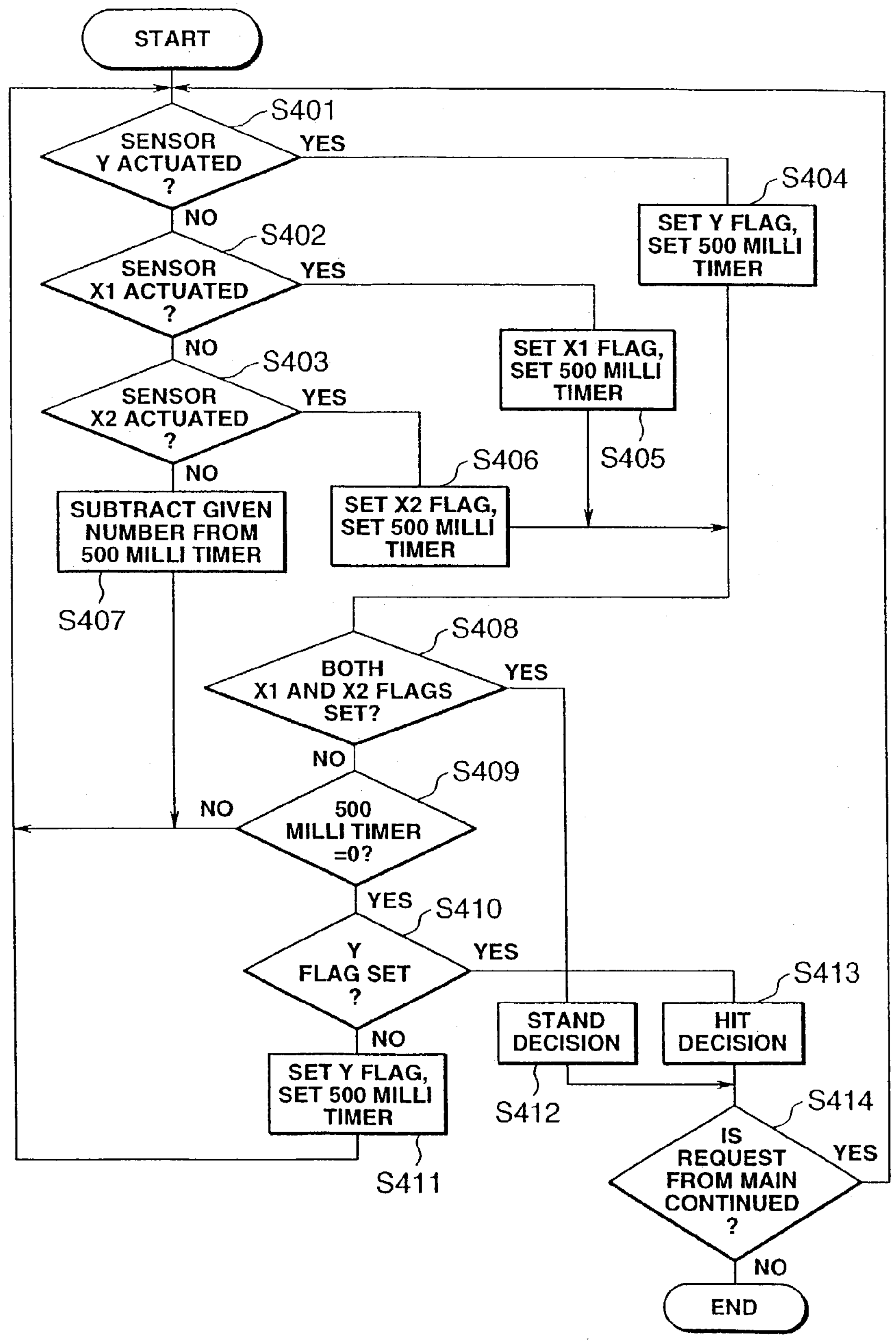
FIG. 26 is a block diagram showing a flow chart of the processing system of the game device pertaining to EMBODIMENT 3.

FIG. 25 is a block diagram showing the processing system for signals from the photoreceptor section. FIG. 26 is a flow chart of processing.

Figure 23:
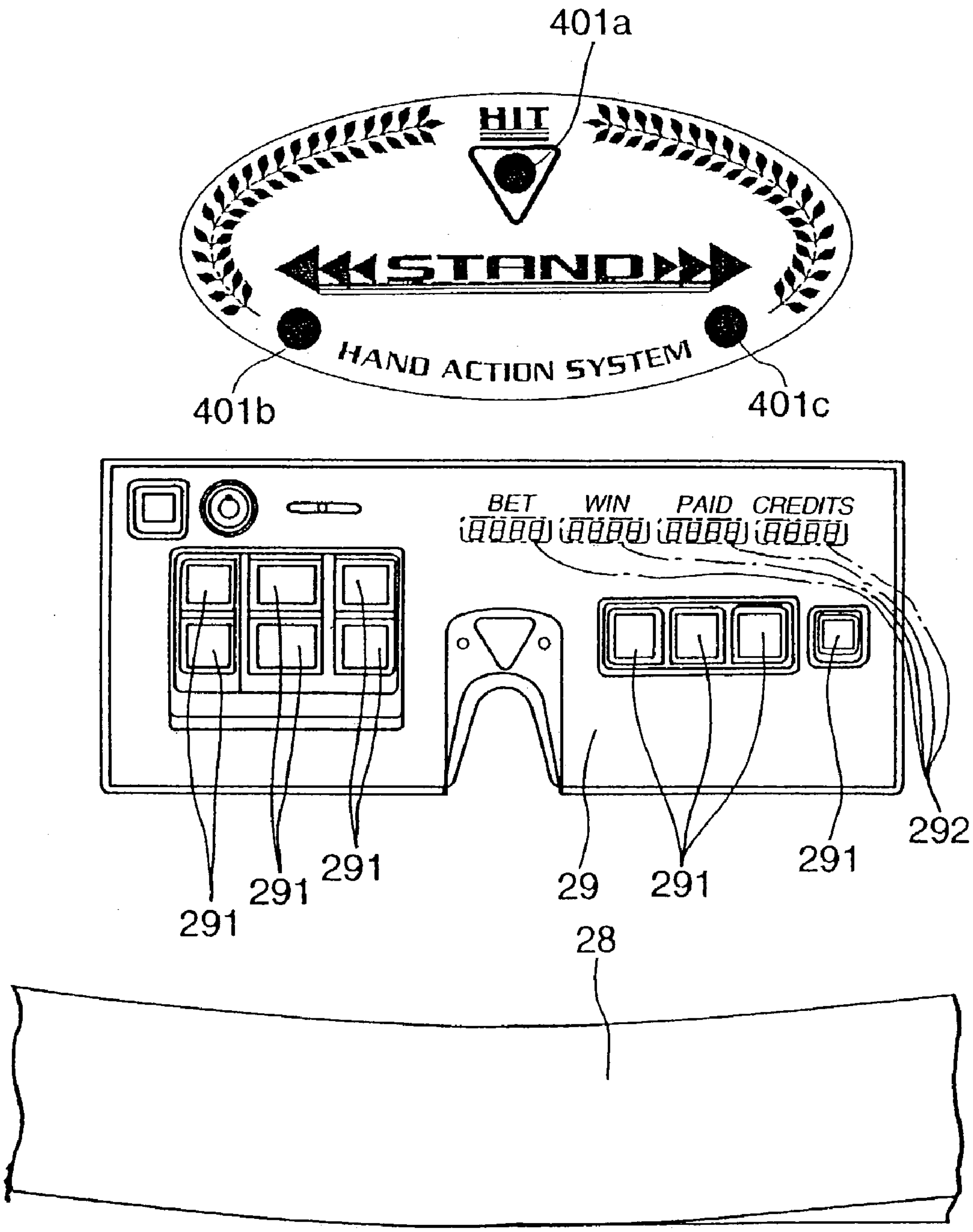
FIG. 23 is a plan view depicting placement of the control section of a satellite component of the game device of EMBODIMENT 3.
Figure 24:
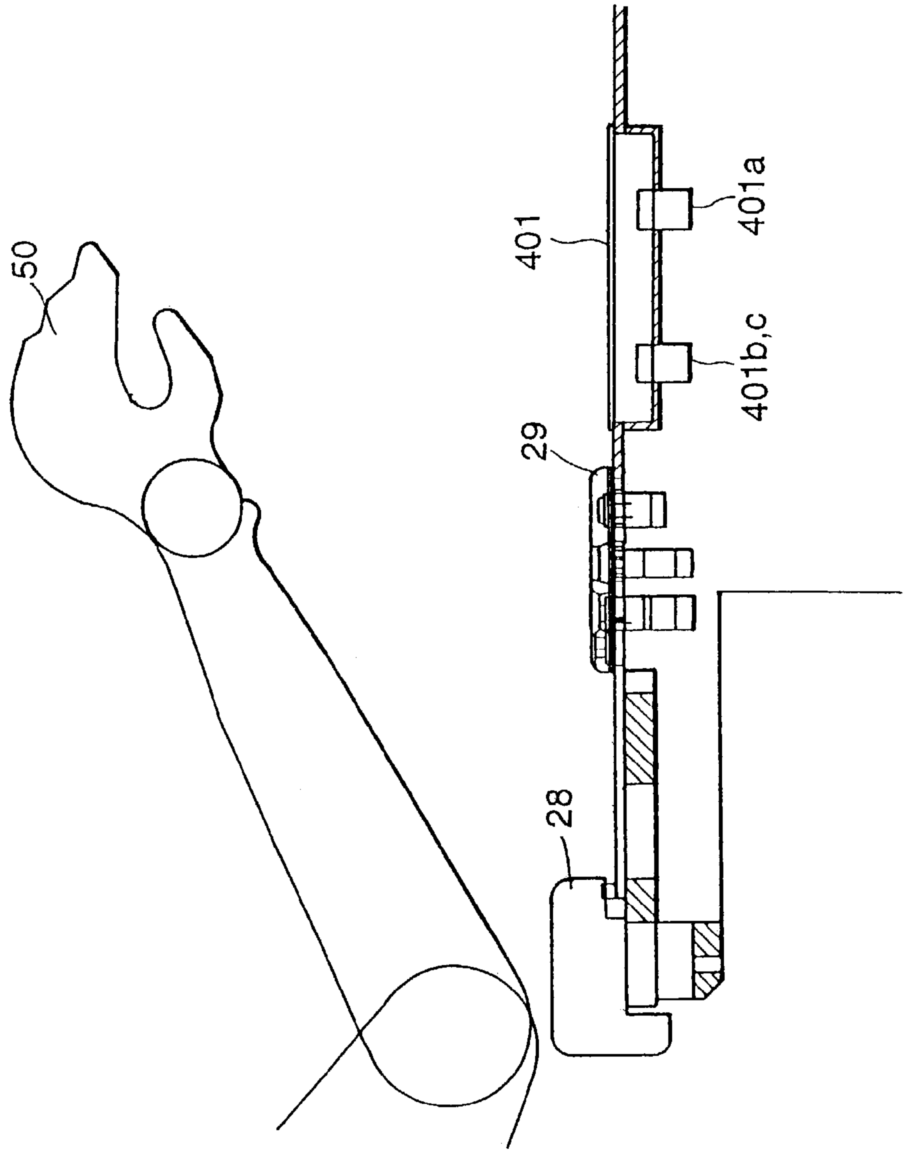
FIG. 24 is a sectional view of the control section in EMBODIMENT 3.

FIG. 23 is a plan view depicting details of the control section of a satellite component of the game device, and FIG. 24 is a sectional view of the control section.

According to EMBODIMENT 2 depicted in these drawings, each satellite 3 is provided with optical control input means 401 and a control indicator panel 29. The three sensors-401*a–c* of the optical control input means sense the player's hand as it moves over the input means 30. A decorative panel (glass plate) is provided over the sensors. The glass plate protects the sensors as well as facilitating infrared light emission and reflected light incidence.

The operation will now be described. As described earlier, the sensors sense whether a player's hand movement indicates a STAND or a HIT. Generally speaking, sideways motion of the hand indicates STAND while slight forward extension of the hand indicates HIT. However, there are no strict rules regarding the manner of hand movement or the duration for which it is held out.

The following determinations are made on the basis of actuated sensor combinations.

(1) Where only sensor Y (401*a*) has been actuated, a HIT command is posited.

(2) Where sensors Y (401*a*) and X1 (401*b*) have been actuated in no special order, a HIT command is posited. While sideways motion of the hand is present in this case, a HIT command decision should be made since the hand has been placed over the location of sensor Y.

(3) Similarly, where sensors Y (401*a*) and X2 (401*c*) have been actuated in no special order, a HIT command is posited.

(4) Where sensors X1 (401*b*) and X2 (401*c*) have been actuated in no special order, a STAND command is posited.

(5) Where sensors X1 (401*b*), X2 (401*c*), and Y (401*a*) have been actuated in no special order, a STAND command is posited. Since hand movement in this case consists principally of sideways movement, a STAND command decision should be made even where sensor Y, which indicates a HIT command, has been actuated.

(6) Where only sensor X1 has been actuated, no command is posited. Similarly, no command is posited where only sensor X2 has been actuated.

When the plurality of sensors are actuated, the intervals thereof are a problem. As an example, let it be assumed that this interval is 500 milliseconds. Specifically, the arithmetic means 402 continues to monitor the other sensors for actuation for a period of 500 milliseconds after actuation of the initial sensor. If both sensors X1 and X2 are actuated before monitoring is terminated, a STAND determination is made. If only one of the sensors X1 and X2 is actuated (or if neither of them is actuated) and sensor Y is actuated, a HIT determination is made.

In order to properly determine an input content, it is preferable to arrange sensors X1 and X2 at some distance from each other in the sideways direction, as shown in FIG. 21. That is, the arrangement is such that both sensors X1 and X2 do not react if the player does not move his or her hand to a certain extent in the horizontal direction. Placement in this way ensures that reaction of sensors X1 and X2 reflects deliberate hand movement by the player, allowing the determination to be made that a STAND command has been made regardless of the presence or absence of a reaction by sensor Y.

In preferred practice, sensor Y is positioned some distance away from sensors X1 and X2. In this case, reaction by sensor Y indicates that the player has positively extended his or her hand a great distance in order to move the hand in the vertical direction, and thus the determination may basically be made that a HIT action has been made. The determination made that Y has reacted apropos of a STAND action is made only where sensors X1 and X2 have reacted as well.

The hand action evaluation algorithm used in determination of STAND commands and HIT commands is executed through a main program request. Termination of the main program request terminates operation of the program for sensing hand action. FIG. 26 shows a flow chart for the hand action evaluation algorithm.

Referring to FIG. 26, a determination is made as to whether sensor Y has been actuated (S401). If YES, a flag is set for sensor Y, and a timer is set to 500 msec, for example (S404). A determination is made as to whether both sensor X1 and S2 flags have been set (S408). If YES, a STAND command determination is made in the manner described earlier (S412) and the decision outcome is returned. If there is still a main program request (YES), the process is repeated from the beginning (S414). On the other hand, if sensor X1 and X2 flags have not been set in S408, the timer is checked to determine if the set time (500 msec) has elapsed. If not elapsed (NO), the system returns to the initial process S401. If elapsed (YES), a check is performed to determine if the Y flag is set (S410). If set (YES), a HIT is posited (S414) and the decision outcome is returned. If there is still a main program request (YES), the process is repeated from the beginning (S414). If not (NO), the Y flag is set and the timer is set to 500 msec, for example (S411) and the system returns to the initial process (S401).

In the event of a NO determination in S401, a determination is made as to whether sensor X1 has been actuated (S402). If YES, a flag is set for sensor X1, and a timer is set to 500 msec, for example (S405). If NO, a determination is made as to whether sensor X2 has been actuated (S403). If YES, a flag is set for sensor X2, and a timer is set to 500 msec, for example (S406). If NO, a given number is subtracted from the 500 milli timer corresponding to the elapsed time.

The aforementioned (1) "where only sensor Y (401*a*) has been actuated" results in a HIT command determination through the processes of S401, S404, and S413 in FIG. 26.

The aforementioned (2) "where sensors Y (401*a*) and X1 (401*b*) have been actuated in no special order" results in a HIT command determination through the processes of S401, S404, and S413 or S402, S405, and S413.

The aforementioned (3) "where sensors Y (401*a*) and X2 (401*c*) have been actuated in no special order" results in a HIT command determination through the processes of S401, S404, and S413 or S403, S406, and S413.

The aforementioned (4) "where sensors X1 (401*b*) and X2 (401*c*) have been actuated in no special order" results in a STAND command determination through the processes of S402, S405, and S412 or S403, S406, and S412.

The aforementioned (5) "where sensors X1 (401*b*), X2 (401*c*), and Y (401*a*) have been actuated in no special order" results in a STAND command determination through the processes of S401, 5404, S408 or S412, S402, S405, S408, and S412 or S403, S406, S408, and S412.

The aforementioned (6) "where only sensor X1 has been actuated" results in going through the routine of S402, S405, S408, and S409 or S410 and S411, with no command determination being made. Similarly, no command determination is made in the event that only sensor X2 has been actuated.

Only one HIT command and one STAND command may be allowed during a single play, or multiple commands may be allowed. Where only one is allowed, the processes indicated by the flowchart in FIG. 26 are executed only one time for a single round; where multiple ones are allowed, they are executed multiple times. Blackjack, for example, is a game in which a single dealer and a number of players compare hands during a single round to determine winners and losers. Where there are multiple players, the players hit or stand beginning with the player to the left of the dealer, the turn for expression of intent by the player to the right of the dealer coming last. According to this embodiment, expressions of intent to hit or stand can be made out of turn. If command cancel is not enabled, only one command can be made for each round; where only the last of a number of commands is valid, multiple commands are enabled for a single round. In the latter scenario, one can change ones previously declared intent when one's turn comes around.

According to EMBODIMENT 3 described above, player hand movements can be determined using a small number of sensors. According to EMBODIMENT 3, there is provided low-profile optical input means. Accordingly, the degree of freedom in terms of device design, contributing to ease of use. Since a glass plate or the like bearing designs and indicating the HIT/STAND command positions is arranged over the sensors, it is easy to use for the players and command reliability is improved.

This optical input means makes it possible, in the context of blackjack, a casino card game, played on a commercial game device, for players to express intent through hand movements, just as in a real game. Accordingly, the game, while being played on a machine, reproduces the ambience of actual casino play. An additional effect is a reduced need for to move one's line of sight, which is inconvenient for the player, compared to devices in which button switches are employed.

Since the sensors are hidden below a panel, the players will feel a sense of amazement that their intent can be transmitted to the game device without touching any part of the housing.

In the preceding description, the sensors employ infrared light, but the invention is not limited thereto and may employ ultrasonic waves, for example. Alternatively, hand shadows may be sensed using a single photoreceptor element. In short, any means capable of detecting the presence of a hand a relatively short distance away (0 cm–30 cm from the sensor, for example) may be used.

Figure 22:
FIG. 22 is a diagram depicting the relationship of a cosmetic plate and photoreceptor sensor placement in EMBODIMENT 3.

Sensor placement is not limited to that shown in FIG. 21 or FIG. 22. The HIT and STAND positions may be reversed, and placement is not limited to the isosceles triangle depicted in FIGS. 21 and 22, but may alternatively comprise an equilateral triangle, right triangle, or scalene triangle. In short, it is sufficient for two sensors to be provided for sensing hand motion in the sideways direction, and for a HIT command sensor to be disposed at a location that does not lie on the line connecting these two sensors. In preferred practice, the space between the two sensors is a distance such that STAND commands are easy to make (the hand is easily moved across), and the distance between these two sensors and the HIT command sensor is such that STAND commands will not be erroneously interpreted as HIT commands.

(Variant of Embodiment 3)

A function whereby in the event that a player has made a command that clearly violates the theory of the game, the player is given a one-time warning may be included. This is particularly effective when one has indicated one's intent during one's turn.

For this purpose there is provided erroneous command determination means 404, depicted in FIG. 25, for receiving determination outcomes from the arithmetic means 402, ascertaining whether an erroneous command has been made, and issuing notification of information to this effect in the event of an erroneous command. The erroneous command determination means 404 compares game progress status with player expressions of intent and determines whether an erroneous command has been made. Specifically, a table is prepared that indicates relationships of correspondence among game progress status and possible expressions of intent (including the contents of each hand), as well as evaluations thereof (appropriate versus inappropriate), and the erroneous command determination means 404 refers to this table in making determinations. Alternatively, evaluation coefficients may be computed based on game progress status and possible expressions of intent, and determinations made on the basis of evaluation outcomes. Where the erroneous command determination means 404 determines that an erroneous command has been made, the player may be warned through an effect sound or screen display, for example.

This reduces the risk of misunderstanding or erroneous commands by players.

(Sectional View of Control Indicator Panel)

Figure 27:
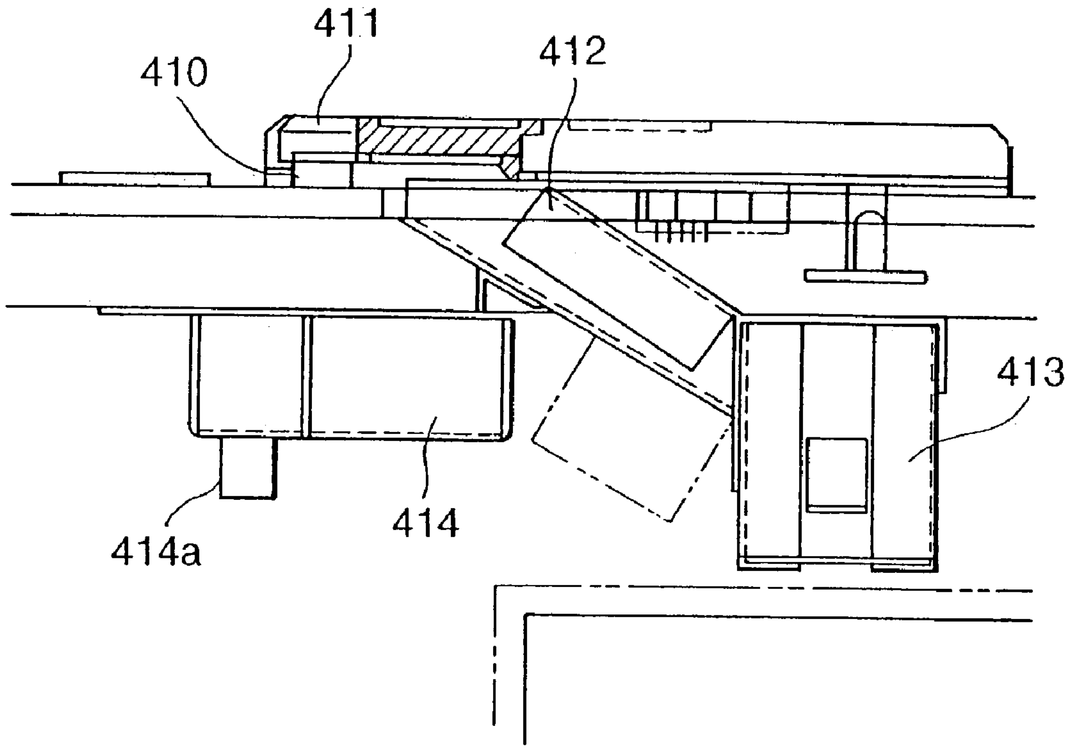
FIG. 27 is a sectional view of the control indicator panel in an embodiment of the present invention.

A sectional view of the control indicator panel used in the foregoing embodiment is shown in FIG. 27. Coins inserted through a coin grid 410 pass through a chute 412 and are collected in a coin collector 413. The coin grid 410 has height and width sufficient for a stack comprising a number of coins to be inserted at one time. In contrast to the conventional token insertion opening of slot form, a coin grid 410 is used, thereby allowing coins to be inserted with the impression of handling chips on the table.

Below the coin grid 410 there is provided a water receptacle 414. This prevents water, juice, or other beverage inadvertently spilled by a player from penetrating into the internal electronic devices through the coin grid 410. Water, etc., collected by the water receptacle 414 is drained from the device through a drain hole 414*a*. While not shown in the drawing, the drain hole 414*a* is connected to a pipe fabricated from vinyl or the like.

According to the present invention described herein, there is provided a game device offering exceptional interactivity, capable of discerning the psychological states of players from sounds and actions made by the players.

According to the present invention there is further provided a game device offering exceptional interactivity through recognition of various conditions of sounds, actions, and the like made by players.

According to the present invention there is further provided a game device capable of reflecting players' subtle internal psychological states in game development through sensing and analysis of sounds and actions made by players.

According to the present invention there is further provided a game device capable of altering the development of the game corresponding to the conditions of sounds made by players.

According to the present invention there is further provided a game device capable of altering the development of the game corresponding to the conditions of players' actions.

According to the present invention there is further provided a game device capable of simulating players' subtle internal psychological states through the agency of sounds, actions, and the like made by players, and reflecting this in the development of the game.

According to the present invention there is further provided a game device capable of simulating players' sophistication, such as strong and weak points, from their judgments regarding the cards in their hand, and reflecting this in the development of the game.

According to the present invention, through sensing these actions, the game machine can be provided with input that closely approximates that in an actual card game, for example, of a sort that is not achieved through button operation of a keyboard, control pad, or other peripheral device, allowing the game device to execute processing in response to input approximating the real thing.

"Means" as used herein does not necessarily refer to physical means, and includes actualization of means functionality through software. A single means functionality may be actualized through two or more physical means, or two or more means functionalities may be actualized through a single physical means,

What is claimed is:

1. A game device that executes a game program, which responds to information entered by players and responds to sounds external to the game device by generating signals that at least change a visual display, comprising:

a plurality of player controls allowing a player to enter information into the game;

a display device that displays an image of a dealer;

at least one sound recognition device for recognizing sounds external to the game device, wherein the recognition device is capable of determining conditions associated with the sounds; and at least one processor for comparing the determined conditions with at least one threshold value and selecting the image of the dealer from a plurality of images in response to the comparison of the determined conditions with the at least one threshold value.

2. The game device according to claim 1, further comprising a player-interactive processor.

3. The game device of claim 1, wherein the plurality of player controls comprise push buttons.

4. The game device of claim 1, wherein the at least one sound recognition device comprises at least one microphone.

5. The game device of claim 1, wherein the sounds external to of the game device are sounds made by a voice of a player.

6. The game device of claim 1, wherein the sounds external to the game device are human vocal sounds.

7. The game device of claim 1, wherein the at least one sound recognition device comprises a sound recognition circuit.

8. The game device of claim 1, further comprising multiple player stations.

9. The game device of claim 1, wherein the display device is selected from a group consisting of a CRT display, a LCD display, and a plasma display.

10. The game device of claim 9, further comprising a processor that controls an output to the at least one visual display in response to a determination by the sound recognition device of conditions associated with sounds.

11. The game device of claim 10, wherein the sound recognition device recognizes reference level bands.

12. The game device of claim 1, wherein the at least one sound recognition device recognizes at least one sound selected from a group consisting of sound level, pitch, intonation, and tone.

13. The device of claim 1, wherein the game program further executes a game program which responds to information entered by players and responds to sounds external to the game device by generating signals that alter development of the game.

14. A multiple-player game device that executes a game program, which responds to information entered by players and responds to external sounds made by a player by generating signals that change a visual display without, comprising:

an interactive game processor capable of controlling the game;

a plurality of player stations;

a plurality of player controls allowing a player to enter information into the game;

a display device that displays an image of a dealer;

at least one microphone for recognizing and collecting sounds;

a sound recognition circuit capable of recognizing the collected sounds and determining conditions associated with the sounds; and at least one central processor for comparing the determined conditions with at least one threshold value and selecting the image of the dealer from a plurality of images in response to the comparison of the determined conditions with the at least one threshold value.

15. A game device that executes a game program, which responds to information entered by players and responds to sounds external to the game device, comprising:

a plurality of player controls allowing a player to enter information into the game;

a display device that displays an image of a dealer;

at least one sound recognition device for recognizing sounds external to the game device, wherein the recognition device is capable of determining conditions associated with the sounds; and at least one processor for comparing the determined conditions with at least one threshold value and selecting a facial expression of the dealer from a Plurality of facial expressions in response to the comparison of the determined conditions with the at least one threshold value.

* * * * *

UNITED STATES PATENT AND TRADEMARK OFFICE

CERTIFICATE OF CORRECTION

PATENT NO. : 7,128,651 B2 Page 1 of 1
APPLICATION NO. : 10/457086
DATED : October 31, 2006
INVENTOR(S) : Tomoji Miyamoto et al.

It is certified that error appears in the above-identified patent and that said Letters Patent is hereby corrected as shown below:

Claim 5, column 19, line 65, “to of the” should read --to the--.

Claim 14, column 20, line 30, “display without,” should read --display,--.

Claim 15, column 20, line 61, “Plurality” should read --plurality--.

Signed and Sealed this

Sixth Day of March, 2007

JON W. DUDAS
*Director of the United States Patent and Trademark Office*